United States Patent
Akagi

(10) Patent No.: US 7,164,116 B2
(45) Date of Patent: Jan. 16, 2007

(54) MONITOR FOR INTRUSION DETECTION

(75) Inventor: Tetsuya Akagi, Kyoto (JP)

(73) Assignee: Omron Corporation, Kyoto (JP)

( * ) Notice: Subject to any disclaimer, the term of this patent is extended or adjusted under 35 U.S.C. 154(b) by 206 days.

(21) Appl. No.: 10/384,766

(22) Filed: Mar. 11, 2003

(65) Prior Publication Data
US 2003/0234347 A1  Dec. 25, 2003

(30) Foreign Application Priority Data
Mar. 13, 2002  (JP)  .............. 2002-068022

(51) Int. Cl.
G01V 8/10 (2006.01)
G01C 3/08 (2006.01)
G01S 17/48 (2006.01)
G08B 13/18 (2006.01)

(52) U.S. Cl. .............. 250/221; 356/3.07; 340/557; 348/153

(58) Field of Classification Search ........... 250/221, 250/222.1, 559.38; 356/3.01–3.03, 3.06, 356/3.07, 3.09, 4.01, 5.01, 5.02; 340/540, 340/541, 555–557; 348/152–155
See application file for complete search history.

(56) References Cited

U.S. PATENT DOCUMENTS

| 3,811,010 | A | * | 5/1974 | Long | 348/154 |
| 5,134,386 | A | * | 7/1992 | Swanic | 340/541 |
| 5,500,525 | A | * | 3/1996 | Saban | 250/221 |
| 5,539,199 | A | * | 7/1996 | Ruckh et al. | 250/222.1 |
| 5,638,164 | A | * | 6/1997 | Landau | 356/5.01 |
| 5,910,767 | A | * | 6/1999 | Frucht | 340/557 |
| 5,937,092 | A | * | 8/1999 | Wootton et al. | 382/192 |
| 6,448,572 | B1 | * | 9/2002 | Tennant et al. | 250/559.38 |
| 2002/0050924 | A1 | * | 5/2002 | Mahbub | 340/426 |
| 2003/0137759 | A1 | * | 7/2003 | Pesik | 359/883 |

* cited by examiner

Primary Examiner—Thanh X. Luu
Assistant Examiner—Stephen Yam
(74) Attorney, Agent, or Firm—Foley & Lardner LLP

(57) ABSTRACT

A monitor for intrusion detection features a detecting arrangement for detecting an intruding object in a 3-dimensional area and outputting corresponding detection information, a setting arrangement for setting information necessary for monitoring the position or actions of the intruding object in the 3-dimensional area, a monitoring information generating arrangement for generating monitoring information concerning the position or actions of the intruding object in the 3-dimensional area, on the basis of the detection information generated by the detecting arrangement and the setting information by the setting arrangement, and an external output arrangement for outputting an control output or a display output according to the monitoring information concerning the position or actions of the intruding object generated by the monitoring information generating means.

14 Claims, 36 Drawing Sheets

Difference extraction image

Monitored image

Initial image

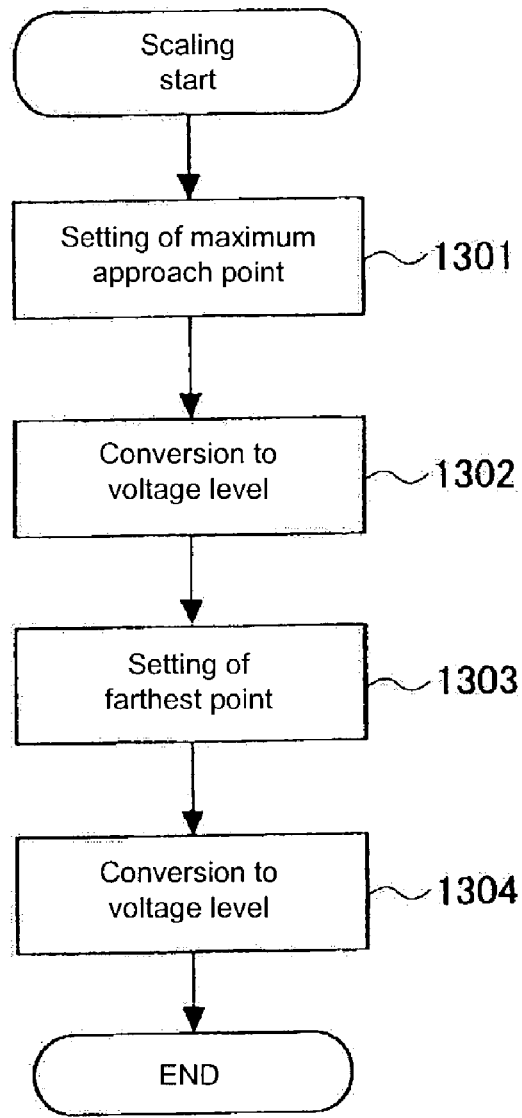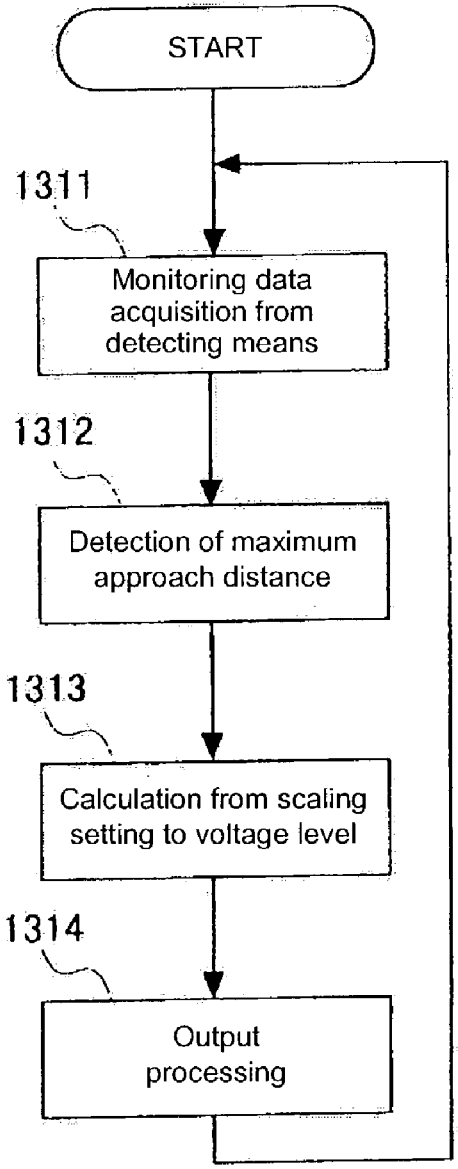
Fig. 13A
Scaling processing
Fig. 13B
Voltage conversion equivalent to maximum approach distance and output processing Function to leave out a specific object
from monitoring object Function to monitor the distance between
a moving object and an intruding object ⇩ Response speed is enhanced in proportion to reduction ratio of scanning units.

Since the number of scanning units is the same, resolution is improved according to the degree at which a scanning range is limited.

<Front view>

<Side view>

MONITOR FOR INTRUSION DETECTION

BACKGROUND OF THE INVENTION

1. Field of the Invention

The present invention relates to an intrusion monitoring arrangement or intrusion monitor (hereinafter simply monitor), which uses detecting means that enables the detection of intruding object in a 3-dimensional volume or space. More specifically, the invention relates to a monitor that enables detecting the position or actions of such an intruding object in a 3-dimensional volume or space (viz., an object to be monitored) with high degree of freedom.

2. Description of the Background Art

Conventionally, in the fields of FA (Factory Automation) and the like, so as to monitor a human body (viz., a person) intruding into a dangerous area, a monitor like a light curtain device, a laser scan type sensor or so has been employed.

A light curtain device has two posts arranged upright with an adequate distance (a light projecting post and a light receiving post). In the light projecting post, many light projectors are embedded with an appropriate intervals in the lengthwise direction thereof. In the same manner, in the light receiving post, many light receivers are embedded with an appropriate intervals in the lengthwise direction thereof. Between the light projecting post and the light receiving post, a light film (an optical curtain) is statically formed by many light beams connecting the light projectors and the light receivers. When this light film is blocked, an intruding object is detected via output from the light receivers.

In a laser scan type sensor, laser beam radiated from a laser light source is scanned linearly and repeatedly in a specified angle range, thereby a fan-shaped light film is dynamically formed. When this light film is blocked, an intruding object is detected via presence or absence of reflected light.

In the conventional monitors like the light curtain device and the laser scan type sensor and the like, mentioned above, the following problems have been pointed out by those skilled in the art.

(1) These monitors adopt detecting means that enables detecting an intruding object only in a 2-dimensional area (plane area), therefore, for example, in a situation where there are plural approaching routes to a dangerous object, in the case to monitor a human body approaching to such a dangerous object, it is required to install monitors in respective intruding routes, as a result, expenses for structuring a monitor system along with a new construction of a structure for installation thereof will increase, which has been a problem with the prior art. From the same reason, in the case of monitoring the degree of approach of an intruding object and forecasting the danger thereof, it is required to install monitors at a number of stages along the approaching route thereof, the expense of the monitor system will increase.

(2) Further, a light curtain normally forms a light film between 2 posts arranged upright, and is effective to an object that intrudes horizontally crossing this light film, while a light curtain is hardly effective to an object that comes in vertically along the light film. In addition, since the array pitch of light projectors and light receiver in posts is fixed, therefore, there is a limitation to the maximum size of an intruding object that can be detected, as a consequence, adjustment after installation lacks of degree of freedom, which has been another problem with the prior art.

(3) While, in a laser scan type sensor, normally a light film is applied horizontally close to a floor surface, therefore, a laser scan type sensor can detect feet of an intruder, but cannot detect hands or the like, as a result, it is hardly useful for the purpose of work safety. In addition, though there is a function to adjust a view angle, it is impossible to adjust response speed or resolution, which has been still another problem with the prior art.

SUMMARY OF THE INVENTION

The present invention has been made in consideration of the problem with monitors according to the prior art, accordingly, it is a general object of the present invention to provide a monitor (viz., a monitoring arrangement) that enables the monitoring of intrusion and enable applications which, for example, monitor the intrusion of a human body or parts thereof into to a dangerous area and/or monitor the approach of a human body to a dangerous object.

It is another object of the present invention to provide a monitor that enables forecasting the possibility of intrusion prior to actual intrusion/approach and providing a warning or the like, thereby avoid decrease of working ratio owing to unnecessary stoppage of devices, in such applications to monitor intrusion of a human body into a dangerous area and to monitor approach of a human body to a dangerous object as mentioned above.

It is still another object of the present invention to provide a monitor that enables arbitrarily setting plural dangerous areas and dangerous objects in a monitoring area, and to monitor intrusion or approach of the respective dangerous areas and dangerous objects and simultaneously forecast intrusion or approach thereof, in such applications to monitor intrusion of a human body to a dangerous area and to monitor approach of a human body to a dangerous object as mentioned above.

It is a further object of the present invention to provide a monitor that enables to arbitrarily exclude intrusion permitted areas including safe routes, normal work routes and the like, from a monitoring objective area, in circumferential areas around a dangerous area, thereby to enhance monitoring precision, in such applications to monitor intrusion of a human body to a dangerous area as mentioned above.

It is a still further object of the present invention to provide a monitor that enables arbitrary objects to be distinguished from dangerous objects and accordingly omitted. This thereby enhances monitoring precision, in such applications wherein it is desired to monitor the approach of a human body (a person) to a dangerous object as mentioned above.

It is another object of the present invention to provide a monitor that enables to precisely monitor approach of a human body to a dangerous object that may move, in such applications to monitor approach of a human body to a moving object as mentioned above.

Other objects and advantages of the present invention will become apparent to those skilled in the art from the detailed description to follow taken in conjunction with the appended claims.

In order to achieve the objects, in the present invention, detecting means that enables to detect an intruding object in a 3-dimensional space or volume (or 3-dimensional monitoring area as it will be referred to hereinafter) is employed.

More specifically, a monitor according to the present invention comprises detecting means for detecting an intruding object in a 3-dimensional monitoring area and outputting corresponding detection information, setting means for setting information necessary for monitoring the position or actions of the intruding object in the 3-dimensional monitoring area, monitoring information generating means for generating monitoring information with respect to the position or actions of the intruding object in the 3-dimensional monitoring area to be the monitoring objective, on the basis of the detection information generated by the detecting means and the setting information by the setting means, and external output means for outputting control output or display output according to the monitoring information with respect to the position or actions of the intruding object generated by the monitoring information generating means to outside.

By adopting such a structure mentioned above, according to a monitor under the present invention, for example, in applications to monitor intrusion of a human body into a dangerous area and to monitor approach of a human body to a dangerous object, it is possible to monitor intrusion and approach in a precise manner, irrespective of intrusion routes. Herein, as "detecting means", there are various preferred embodiments as explained hereinafter.

In a first preferred embodiment, the detecting means includes an optical system employing a camera or an image pickup element, and calculating means for obtaining difference between an image obtained from the optical system in a status without the intruding object and an image obtained in a status with the intruding object, and thereby the detecting means outputs difference information obtained from the calculating means as the detection information.

According to such a structure mentioned above, an optical system consists simply of a camera or an image pickup element, in addition, mechanically moving parts such as scanning mechanism and the like, are not required, as a result, it is possible to manufacture a monitor at low cost, and a longer service life is expected.

In a second preferred embodiment, the detecting means includes an optical system employing plural cameras or image pickup elements, and calculating means for obtaining difference between images obtained from the respective cameras or image pickup elements configuring the optical system in a status without the intruding object and images obtained in a status with the intruding object, and measuring means for measuring the distance to the intruding object by the principle of triangulation on the basis of difference information obtained from the calculation means per each camera or each image pickup element, and thereby the detecting means outputs distance information to the intruding object measured by the measuring means as the detection information.

According to such a structure mentioned above, although the structure of an optical system may be a bit more complicated than that in the first preferred embodiment, yet mechanically moving parts such as scanning mechanism and the like, are not required, as a result, it is possible to manufacture a monitor at relatively low cost, in addition, since this preferred embodiment employs triangulation technology, there is an advantage that it is possible to precisely monitor the position or actions of an intruding object not only in left and right directions, but also in forward and backward directions.

In a third preferred embodiment, the detecting means includes a coaxial optical system including light projecting means for radiating laser beam light in pulse form (or shape as it will be referred to hereinafter), light receiving means for receiving reflected light of the radiated laser beam light reflecting on an object and coming back, and scanning means for scanning the radiated laser beam light so as to be irradiated in plane shape, and measuring means for measuring the distance to a reflected object per unit scanning angle by optical radar method on the basis of the difference between light projection time and light receiving time of the laser beam light, and thereby the detecting means outputs distance information per scanning angle measured by the measuring means as the detection information.

According to such a structure mentioned above, the radiated laser beam light is irradiated in plane shape, and the distance to a reflected object is measured per unit scanning angle by optical radar method, as a consequence, it is possible to recognize an object in a monitoring object area in a precise and 3-dimensional manner, and on the basis of detection information obtained as mentioned above, it is possible to realize monitoring of an intruding object in various situations at high precision. Further herein, if the scanning means for scanning the laser beam light so as to be irradiated in plane shape includes a semiconductor resonance mirror, since there is few mechanical moving parts, it is possible to achieve a longer service life of detecting means.

In a fourth preferred embodiment, the detecting means includes an optical system including light projecting means for radiating laser slit light, a camera or an image pickup element for monitoring projection lines of the radiated laser slit light, and scanning means for scanning the radiated laser slit light so as to be irradiated in plane shape, and calculating means for obtaining difference between projection line images obtained from the camera or the image pickup element configuring the optical system in a status without the intruding object and projection line images obtained in a status with the intruding object per unit scanning angle, and thereby the detecting means outputs difference information of the projection line images per scanning angle obtained by the calculating means as the detection information.

According to such a structure mentioned above, laser slit light is irradiated in plane shape, and an intruding object is monitored on the basis of changes in projection line images thereof, therefore, even though only a camera or an image pickup element is employed, by making characteristics of a monitoring object tangible into deformation of slit light projection lines, it is possible to reduce image processing load, and to realize highly precise monitoring of an intruding object. Moreover, since scanning traces of scanning means may be made by simple reciprocating linear movement, control on a scanning mechanism may become simpler and easier accordingly.

In a fifth preferred embodiment, the detecting means includes an optical system including light projecting means for radiating laser slit light, a camera or an image pickup element for monitoring projection lines of the radiated laser slit light, and scanning means for scanning the radiated laser slit light so as to be irradiated in plane shape, and calculating means for calculating the maximum approach point among the projection line images of the slit light taken in from the camera or the image pickup element configuring the optical system per unit scanning angle, and thereby the detecting means outputs maximum approach point information obtained per scanning angle from the calculating means as the detection information.

According to such a structure mentioned above, the radiated laser slit light is irradiated in plane shape, and the maximum approach point is calculated per unit scanning angle on the basis of deformation of the projection lines thereof, in addition to the advantage of the fourth preferred embodiment, by extracting only information of the maximum approach point from the detecting means, processes at later stages may be simplified more than the case of processing the entire image data, and response speed may be improved.

In a modified example according to the fifth preferred embodiment, the detecting means includes a coaxial optical system including light projecting means for radiating laser slit light in pulse form (or shape as it will be referred to hereinafter), light receiving means for receiving reflected light of the radiated laser slit light reflecting on an object and coming back, and scanning means for scanning the radiated laser slit light so as to be irradiated in plane shape, and measuring means for obtaining the maximum approach distance among distances to respective points of the laser slit light per unit scanning angle by optical radar method on the basis of the difference between light projection time and light receiving time of the laser slit light, and thereby the detecting means outputs maximum approach distance information obtained per scanning angle by the measuring means as the detection information.

According to such a structure mentioned above, since the radiated laser slit laser light is irradiated in plane shape, and the maximum approach point is calculated per unit scanning angle on the basis of deformation of the projection lines thereof, in addition to the advantage of the fifth preferred embodiment, the speed and precision in acquiring the maximum approach point information may be improved, and response speed may be further improved.

In a sixth preferred embodiment, the detecting means includes an optical system including light projecting means for radiating laser slit light in pulse shape, a photo diode array for receiving reflected light of the radiated laser slit light reflecting on an object and coming back, and scanning means for scanning the radiated laser slit light so as to be irradiated in plane shape, and measuring means for measuring the distance to a reflected object per unit scanning angle by optical radar method on the basis of the difference between light projection time and light receiving time of the laser slit light, and thereby the detecting means outputs distance information to each point on the projection lines measured per scanning angle by the measuring means as the detection information.

According to such a structure mentioned above, the radiated laser slit light is irradiated in plane shape, and distance information to each of a series of points along the projection lines per unit scanning angle is obtained by optical radar method on the basis of deformation of the projection lines thereof, and thereby the situations in the monitoring objective area are recognized in a 3-dimensional manner, monitoring may be made with high speed response and at high precision on the basis of detection information obtained in this manner.

In addition to the, in the respective preferred embodiments mentioned above, if the scanning means for scanning the laser beam light so as to be irradiated in plane shape includes a semiconductor resonance mirror, since it is compact and free of mechanical moving parts, it is possible to achieve a compact size of the entire device and a longer service life. Further, if the scanning range of the scanning means for scanning the laser beam light so as to be irradiated in plane shape is changeable, it is advantageous for limiting an area to a specific range, and improving response speed and resolution.

In another preferred embodiment according to the present invention, the setting means is able to set at least one position or more or one area or more in the 3-dimensional monitoring area as a specific monitoring area, and the monitoring information generating means generates information as to whether the intruding object has advanced into the specific monitoring area or not, and the external output means outputs control output or display output corresponding to the specific monitoring area where the intruding object has advanced to outside.

According to such a structure mentioned above, for example, in applications to monitor intrusion of a human body to a dangerous area, it is possible to arbitrarily set plural dangerous areas in a monitoring area, and to monitor intrusion to the respective dangerous areas at the same time.

In still another preferred embodiment according to the present invention, the setting means is able to set the position of the monitor itself or a position arbitrarily selected from the 3-dimensional monitoring area as a specific monitoring area, and the monitoring information generating means generates information with respect to the distance between the current position of the intruding object and the specific position, and the external output means outputs analog control output or analog display output corresponding to the distance between the intruding object and the specific position to outside.

According to such a structure mentioned above, for example, in applications to monitor intrusion of a human body to a dangerous area and to monitor approach of a human body to a dangerous object, information corresponding to the distance between a dangerous area or a dangerous object and a human body or the like as an intruding object is generated and output, it is possible to forecast possibility prior to actual intrusion or approach and to give a warning or the like.

In further another preferred embodiment according to the present invention, the setting means is able to set the position of the monitor itself or a position arbitrarily selected from the 3-dimensional monitoring area as a specific position, and the monitoring information generating means generates information with respect to the relative movement direction between the intruding object and the specific position, and the external output means generates control output or display output corresponding to whether the relative movement direction is in an approaching direction or in a moving away direction.

According to such a structure mentioned above, in applications to monitor intrusion of a human body to a dangerous area, even when there is an intruding object such as a human body or the like near a dangerous object, according to whether such an intruding object is approaching or moving away, for example, by judging "danger" when approaching, while by judging "avoiding danger" when moving away, it is possible to generate appropriate monitoring information.

In still further another preferred embodiment according to the present invention, by teaching detection information from the detecting means in a status where there is not any intruding object in the 3-dimensional monitoring area, and detection information from the detecting means in a status where there is a dummy object in the 3-dimensional monitoring area, the setting means is able to set the position or area where there is the dummy object as a specific monitoring area.

According to such a structure mentioned above, for example, in a situation to arbitrarily set plural dangerous areas in a monitoring area and to monitor intrusion to the respective dangerous areas simultaneously, teaching may be made only by putting dummy objects in the respective objective dangerous areas, as a result, setting work of these dangerous areas becomes simple.

In another preferred embodiment according to the present invention, by GUI (Graphic User Interface) using a monitor screen for displaying images of the 3-dimensional monitoring area, the setting means is able to set a specific monitoring area or a specific position in the 3-dimensional monitoring area.

According to such a structure mentioned above, for example, in a situation to arbitrarily set plural dangerous areas in a monitoring area and to monitor intrusion to the respective dangerous areas simultaneously, a specific area to be monitored may be set only by designating one by the cursor on a screen of a CRT or a liquid crystal display arranged on a monitor or externally connected thereto, as a result, setting work of such a dangerous area becomes simple.

In still another preferred embodiment according to the present invention, the setting means is able to set a position or an area selected from the 3-dimensional monitoring area as an insensitive area (viz., an area of no concern or relevance), and the monitoring information generating means leaves out the set insensitive area from the 3-dimensional monitoring area, and generates information with respect to the position or actions of the intruding object in the 3-dimensional monitoring area to be the monitoring object, on the basis of the detection information output by the detecting means and the setting information by the setting means.

According to such a structure mentioned above, in applications to monitor intrusion of a human body to a dangerous area, in circumferential areas around a dangerous area, it is possible to leave out permitted areas including safe routes, normal work routes and the like, from a monitoring object area, thereby it is possible to enhance monitoring precision.

In further another preferred embodiment according to the present invention, the setting means is able to set an object (s) whose characteristics are to be taught in advance as being insensitive (viz., of no concern or relevance) such that the monitoring information generating means ignores the insensitive object(s) in the 3-dimensional monitoring area as being a monitoring object, and generates information with respect to the position or actions of the intruding object in the 3-dimensional monitoring area to be the monitoring objective, on the basis of the detection information output by the detecting means and the setting information by the setting means.

According to such a structure mentioned above, on a factory floor, it is possible to leave out those objects such as those which innocuously move regularly (for example) along a track of a conveyor or the like, as different from dangerous objects, and to recognize (focus on) those objects that move in irregular running tracks (move irregularly) like a working car running on floor, as dangerous objects, by setting the characteristics of the objects to be removed (for example, shape, color, size, pattern, etc.) as insensitive objects. This makes it is possible to improve the degree of freedom in selecting monitoring objectives.

In still further another preferred embodiment according to the present invention, the setting means is able to set an object whose characteristics are to be taught in advance as a distance reference object, and the monitoring information generating means generates information with respect to the distance between the distance reference object and the intruding object, on the basis of the detection information output by the detecting means and the setting information by the setting means.

According to such a structure mentioned above, in applications to monitor approach a human body to a dangerous object, even in a situation where such a dangerous object moves, by teaching the characteristics of the objects to be removed (for example, shape, color, size, pattern, etc.) to a device, it is possible to precisely monitor the approach of a human body to such a moving object.

In another preferred embodiment according to the present invention, the detecting means is able to facilitate detection response with respect to a limited 3-dimensional monitoring area, by reducing the number of scanning units (viz., pixels) without changing scanning unit amount, in scanning means for scanning laser light so as to be irradiated in plane shape.

According to such a structure mentioned above, in the case where there is an intruding object swiftly moving in a 3-dimensional monitoring area, monitoring area is limited to the small area including the intruding object concerned and monitoring is carried out at high speed response, as a consequence, it is possible to carry out appropriate monitoring to fit behavior characteristics of the intruding object.

In still another preferred embodiment according to the present invention, the setting means is able to facilitate detection resolution with respect to a limited 3-dimensional monitoring area, by reducing scanning unit amount without changing the number of scanning units, in scanning means for scanning laser light so as to be irradiated in plane shape.

According to such a structure mentioned above, in the case where there is an intruding object having fine appearance characteristics or troublesome fine movement styles in a 3-dimensional monitoring area, monitoring area is limited to the small area including the intruding object concerned and monitoring is carried out at high resolution, as a consequence, it is possible to carry out appropriate monitoring to fit appearance characteristics and fine movement characteristics of the intruding object.

Next, a monitor system as one of applied embodiments according to the present invention comprises a first monitor for monitoring an intruding object in a 3-dimensional monitoring area, by use of detecting means for detecting the intruding object in the 3-dimensional monitoring area, a second monitor for monitoring an intruding object in a 3-dimensional monitoring area, by use of detecting means for detecting the intruding object in the 3-dimensional monitoring area, and communication means for transmitting information between the first monitor and the second monitor, wherein the first monitor is equipped with a function to inform the second monitor via the communication means of the position of the intruding object if found in the 3-dimensional monitoring area, and the second monitor is equipped with a function to limit the monitoring range to a limited area including the position of the intruding object at information of the intruding object found and the position thereof from the first monitor, and increase detection response or detection resolution, thereby carry out monitoring.

According to such a structure mentioned above, by carrying out monitoring by use of 2 units or more of monitors, and exchanging information with respect to an intruding object detection between these monitors, it is possible to make the most of capabilities of each of the monitors, and through cooperation between the monitors, it is possible to monitor an intruding object in an efficient manner.

BRIEF DESCRIPTION OF THE DRAWINGS

FIGS. 13A and 13B are flow charts showing the signal processing of the detecting means in the fifth preferred embodiment.

DESCRIPTION OF THE PREFERRED EMBODIMENTS

Figure 1:
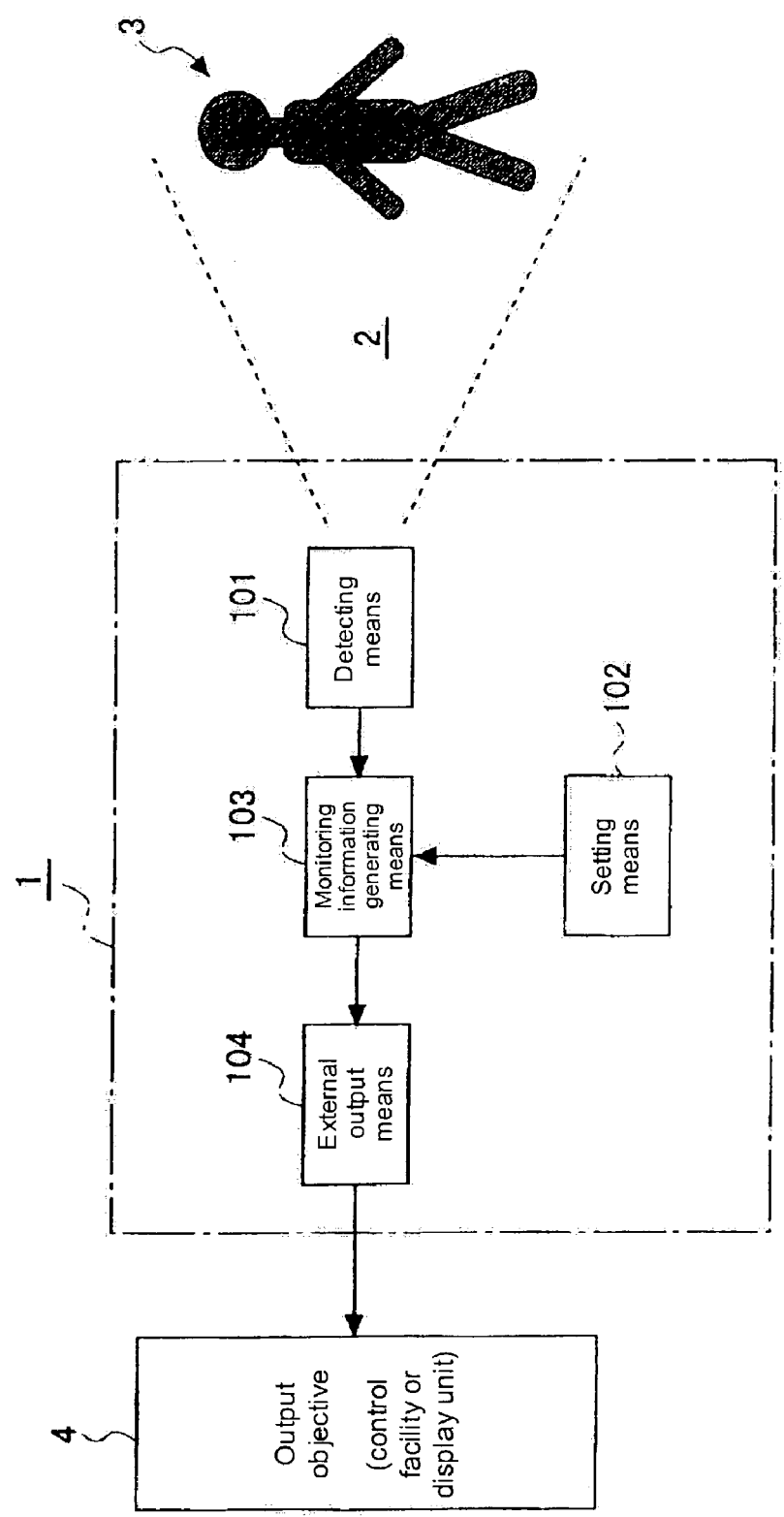
FIG. 1 is a block diagram of a fundamental structure of the present invention.

The present invention is illustrated in more details by reference to the following referential drawings and preferred embodiments wherein FIG. 1 shows a block diagram of a fundamental structure of the present invention. In FIG. 1, the code 1 is a monitor, 2 is a 3-dimensional monitoring area to become a monitoring area, 3 is a human body as an intruding object, and 4 is an output object of a control objective facility or a display unit or the like.

As shown in the figure, the monitor 1 according to the present invention is characterized by comprising detecting means 101 for detecting an intruding object 3 in a 3-dimensional monitoring area 2 and outputting corresponding detection information, setting means 102 for setting information necessary for monitoring the position or actions of the intruding object 3 in the 3-dimensional monitoring area 2, monitoring information generating means 103 for generating monitoring information concerning the position or actions of the intruding object 3 in the 3-dimensional monitoring area 2 to be the monitoring objective, on the basis of the detection information generated by the detecting means 101 and the setting information by the setting means 102, and external output means 104 for outputting control output or display output according to the monitoring information concerning the position or actions of the intruding object 3 generated by the monitoring information generating means 103 to the outside.

With regard to the monitor 1 as explained above, there are various preferred embodiments according to what a structure is adopted as the detecting means 101 thereof.

Namely, in a monitor in a first preferred embodiment, the detecting means 101 includes an optical system employing a camera or an image pickup element, and calculating means for obtaining difference between an image obtained from the optical system in a status without the intruding object and an image obtained in a status with the intruding object, and thereby the detecting means outputs difference information obtained from the calculating means as the detection information.

It is supposed that structures of such an optical system and calculating means may be easily understood from the drawings and the like, in more complicated other preferred embodiments described later herein, therefore, structural drawings of an optical system, hardware and software configurations of calculating means are not illustrated herein. Namely, it is needless to say that an optical system may be realized by a combination of a CCD camera, a CCD element, and a separate line of special lenses, while calculating means for extracting difference may be realized by image processing technologies using a computer.

Figure 2C:
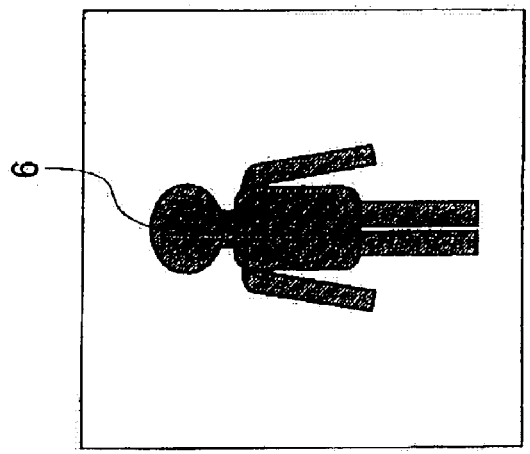
FIGS. 2A, 2B and 2C are explanatory diagrams for signal processing of detecting means in the first preferred embodiment.
Figure 2B:
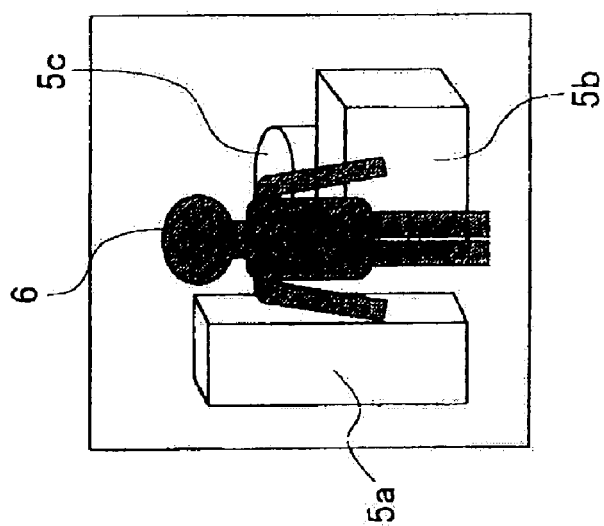
Figure 2A:
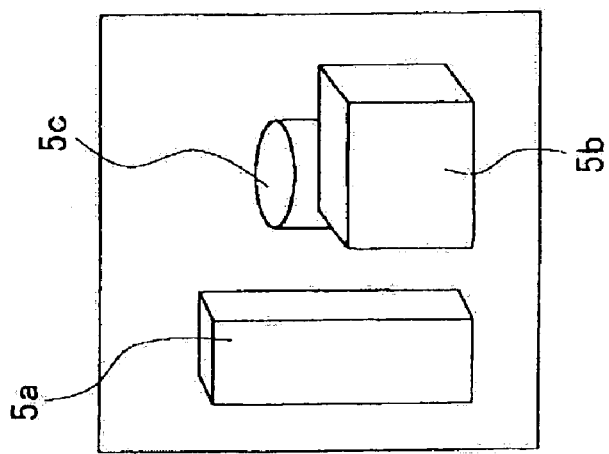

Further, an explanatory diagram for signal processing of detecting means in the first preferred embodiment is schematically shown in FIG. 2. FIG. 2A through FIG. 2C show the concept of the processing for obtaining difference between an image where there is not any intruding object and that where there is one from an optical system. The image shown in FIG. 2A is an initial image obtained from an optical system in the status where there is no intruding object in a 3-dimensional monitoring area. In this initial image, only background objects 5a, 5b, and 5c are included. The image shown in FIG. 2B is a monitored image obtained in a status where there is an intruding object in a 3-dimensional monitoring area. In this monitored image, in addition to the background objects 5a, 5b, and 5c, an intruding object (human body) 6 is included. While, the image shown in FIG. 2C is a difference extraction image obtained by taking the difference between the initial image shown in FIG. 2A and the monitored image shown in FIG. 2B. In this image, only the intruding object (human body) 6 is included.

As explained above, in the detecting means 101 in the first preferred embodiment, difference information between the image taken in a status where there is no intruding object and that taken in a status where there is one is output as detection information from an optical system.

In the monitoring information generating means 103, on the basis of each difference extraction image obtained as explained above and changes in difference extraction images obtained before and after each image, monitoring information with respect to the position or actions of the intruding object 6 in the 3-dimensional monitoring area is generated. More specifically, on the basis of the position, size and the like, on the screen of the image of the difference extraction image 6, the actual position in the monitoring objective area is obtained by calculation, and then is compared with separately set dangerous object and dangerous area, thereby necessary monitoring information is generated. Monitoring information generated as explained above is transferred via the external output means 104 as control output or display output to an output object 4. Thereby, when such an output object is a facility, control is made to give a warning at the moment of intrusion detection of a dangerous object, and to suspend operation and the like. On the other hand, if such an output object is a display unit, object intrusion, object approach, difference extraction image itself shown in FIG. 2C and so forth are arbitrarily displayed on a CRT or LCD screen of an external display unit.

According to the first preferred embodiment, an optical system just consists of a camera or an image pickup element, in addition, mechanically moving parts such as scanning mechanism and the like, are not required, as a result, it is possible to manufacture a monitor at low cost, and a longer service life is expected.

Next, in the second preferred embodiment of a monitor under the present invention, the detecting means 101 includes an optical system employing plural cameras or image pickup elements, and calculating means for obtaining difference between images obtained from the respective cameras or image pickup elements configuring the optical system in a status without the intruding object and images obtained in a status with the intruding object, and measuring means for measuring the distance to the intruding object by the principle of triangulation on the basis of difference information obtained from the calculation means per each camera or each image pickup element, and thereby the detecting means outputs distance information to the intruding object measured by the measuring means as the detection information.

Figure 3:
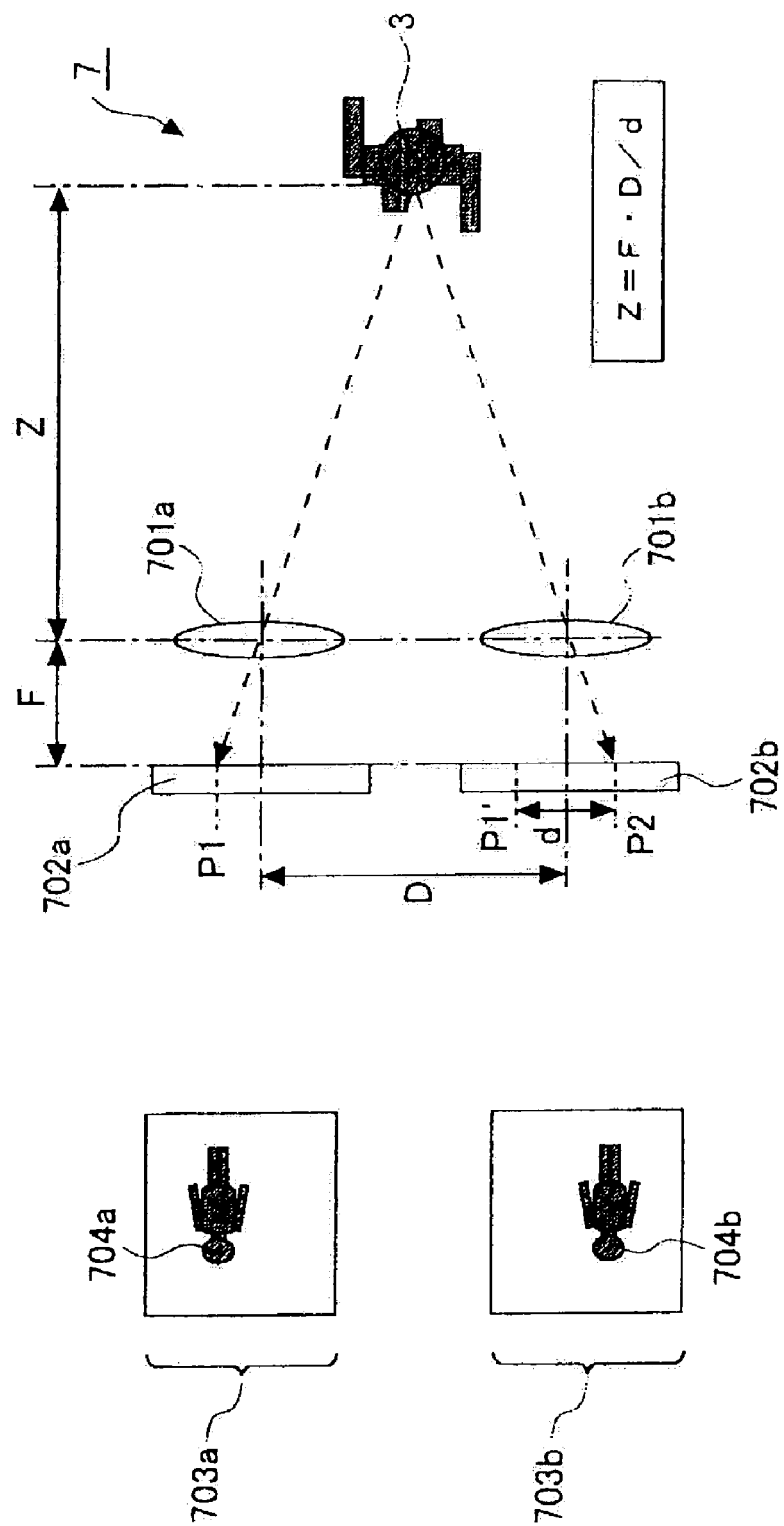
FIG. 3 is a structural diagram of an optical system of the detecting means in the second preferred embodiment.

A structural diagram showing an example of an optical system of the detecting means in the second preferred embodiment is shown in FIG. 3. As shown in the figure, this optical system 7 includes a pair of left and right optical systems consisting of a first optical system positioned at the left side and a second optical system positioned at the right side. The first optical system includes a first lens 701a and a first image pickup element (consisting of a CCD image sensor and so forth) 702a. The second optical system includes a second lens 701b and a second image pickup element (consisting of a CCD image sensor and so forth) 702b. The optical axis of the first optical system and that of the second optical system are arranged parallel with each other, and these optical axes are arranged apart by a distance D, and as shown in FIG. 3, parallel.

When a human body or person 3 as an intruding object is photographed by use of such an optical system, on the light receiving surfaces of the first image pickup element 702a and the second image pickup element 702b, an image of the human body 3 including background objects is formed. Then, to the images taken by the first image pickup element 702a and the second image pickup element 702b, the difference extraction processing explained in reference to FIG. 2 is carried out.

What is shown with the code 703a is the image of the first image pickup element 702a after the difference extraction processing, while what is shown with the code 703b is the image of the second image pickup element 702b after the difference extraction processing. As apparent from these figures, in the images after the difference extraction processing, background objects have been removed, and only images 704a and 704b corresponding to the human body 3 are shown therein. Herein, as clear from the figures, when the position of the image 704a is set as P1, while that of the image 704b is set as P2, then the point P1 is displaced to the left from the optical axis, while the point P2 is displaced to the right from the optical axis. In other words, there are azimuth differences from the centers of the respective optical axes in both the image pickup elements 702a and 702b. herein, when the sum of these azimuth differences is set as d, and the focal distance of the first lens and the second lens is set as F, and the distance from these lenses to the human body 3 is set as Z, by the principle of triangulation, the value of the distance Z between lenses and the intruding object may be obtained by the following equation.

$$Z = F \cdot D / d \qquad (1)$$

According to the second preferred embodiment explained above, although the structure of an optical system may be a bit more complicated than that in the first preferred embodiment, yet mechanically moving parts such as scanning mechanism and the like, are not required, as a result, it is possible to manufacture a monitor at relatively low cost, in addition, since this preferred embodiment employs triangulation technology, there is an advantage that it is possible to precisely monitor the position or actions of an intruding object not only in left and right directions, but also in forward and backward directions.

Next, in the third preferred embodiment of a monitor under the present invention, the detecting means includes a coaxial optical system including light projecting means for radiating laser beam light in pulse shape, light receiving means for receiving reflected light of the radiated laser beam light reflecting on an object and coming back, and scanning means for scanning the radiated laser beam light so as to be irradiated in plane shape, and measuring means for measuring the distance to a reflected object per unit scanning angle by optical radar method on the basis of the difference between light projection time and light receiving time of the laser beam light, and thereby the detecting means outputs distance information per scanning angle measured by the measuring means as the detection information.

Figure 4:
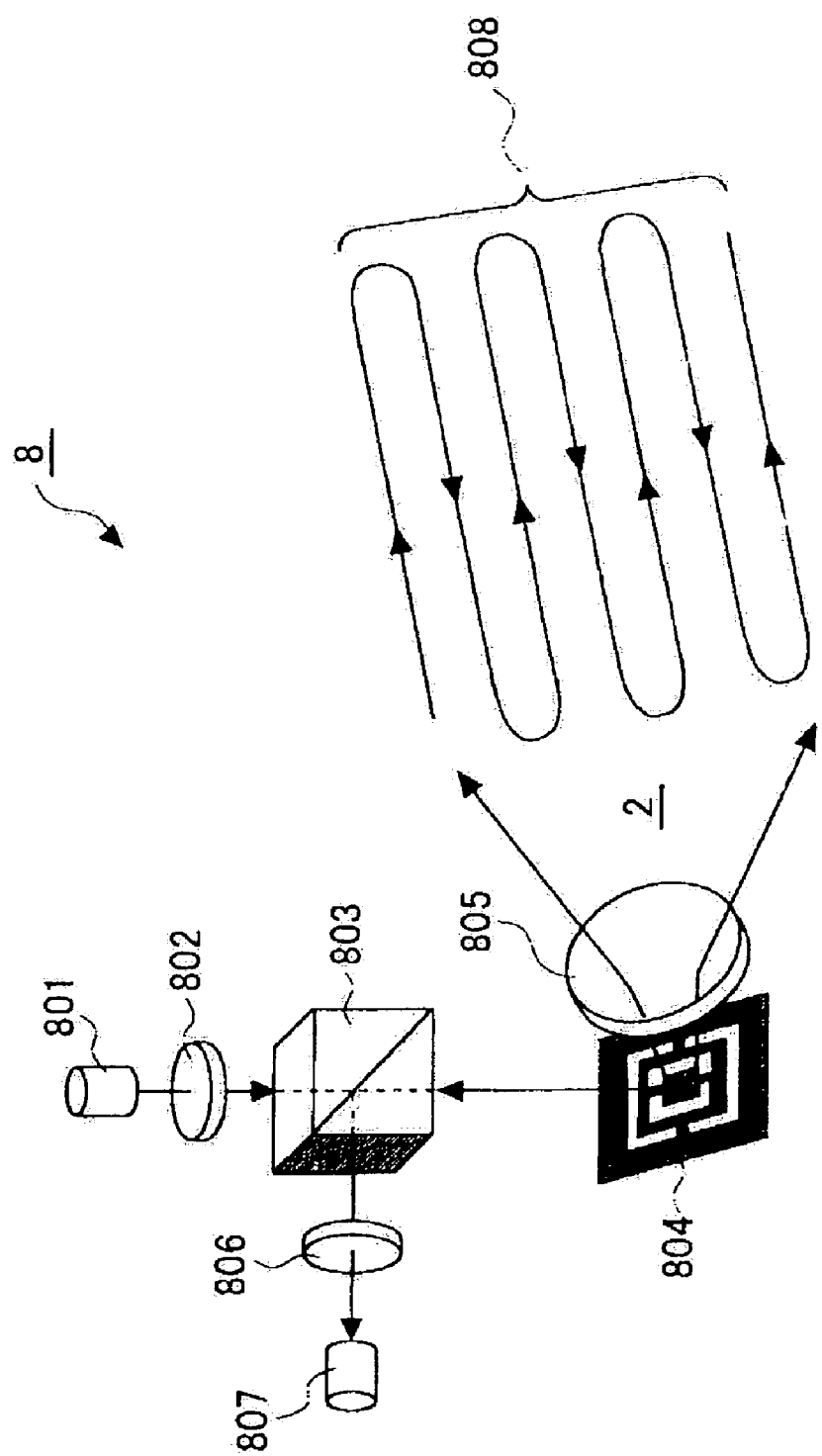
FIG. 4 is a structural diagram of an optical system of the detecting means in the third preferred embodiment.

A structural diagram showing an example of an optical system of the detecting means in the third preferred embodiment is shown in FIG. 4. As shown in the figure, this optical system 8 includes a laser light source 801, a first lens 802, a beam splitter 803, a semiconductor resonance mirror 804 as scanning means, a second lens 805, a third lens 806, and a light receiving element 807.

Pulsed laser light from the laser light source 801 is converged by the first lens 802, then goes through the beam splitter 803, and is irradiated onto the semiconductor resonance mirror 804. Laser light reflected by the semiconductor resonance mirror 804 is converged by the second lens 805 is formed into laser beam, then is radiated to a 3-dimensional monitoring area 2 to become a monitoring object. At this time, the semiconductor resonance mirror 804 is given an appropriate horizontal driving signal and a vertical driving signal, thereby as shown in a plane-shaped scanning trace 808, the semiconductor resonance mirror 804 repeats reciprocating horizontal scanning in a short cycle and reciprocating vertical scanning in a long cycle. Thereby, the pulsed laser beam radiated from the second lens 805, as shown in the plane-shaped scanning trace 808, is scanned in a plane shape in the 3-dimensional monitoring area. By the way, scanning means is not limited to a semiconductor resonance mirror, but may be substituted by a polygon mirror, a rotating mirror, and the like.

On the other hand, reflected light reflected by the object existing in the 3-dimensional monitoring area to be a monitoring area is returned via the second lens 805 and the semiconductor resonance mirror 804, then is branched by the beam splitter 803 to the third lens 806, and is irradiated to the light receiving element 807. The lighting cycle of the laser light source 801 is set sufficiently short in comparison with the horizontal scanning cycle of the plane-shaped scanning trace 807. Therefore, from the time difference between the lighting timing of the laser light source 801 and the light receiving timing of the light receiving element 807, it is possible to obtain distance information to the detected object per each of a series of monitoring points along the plane-shaped scanning trace 807 by the principle of optical radar.

Figure 5:
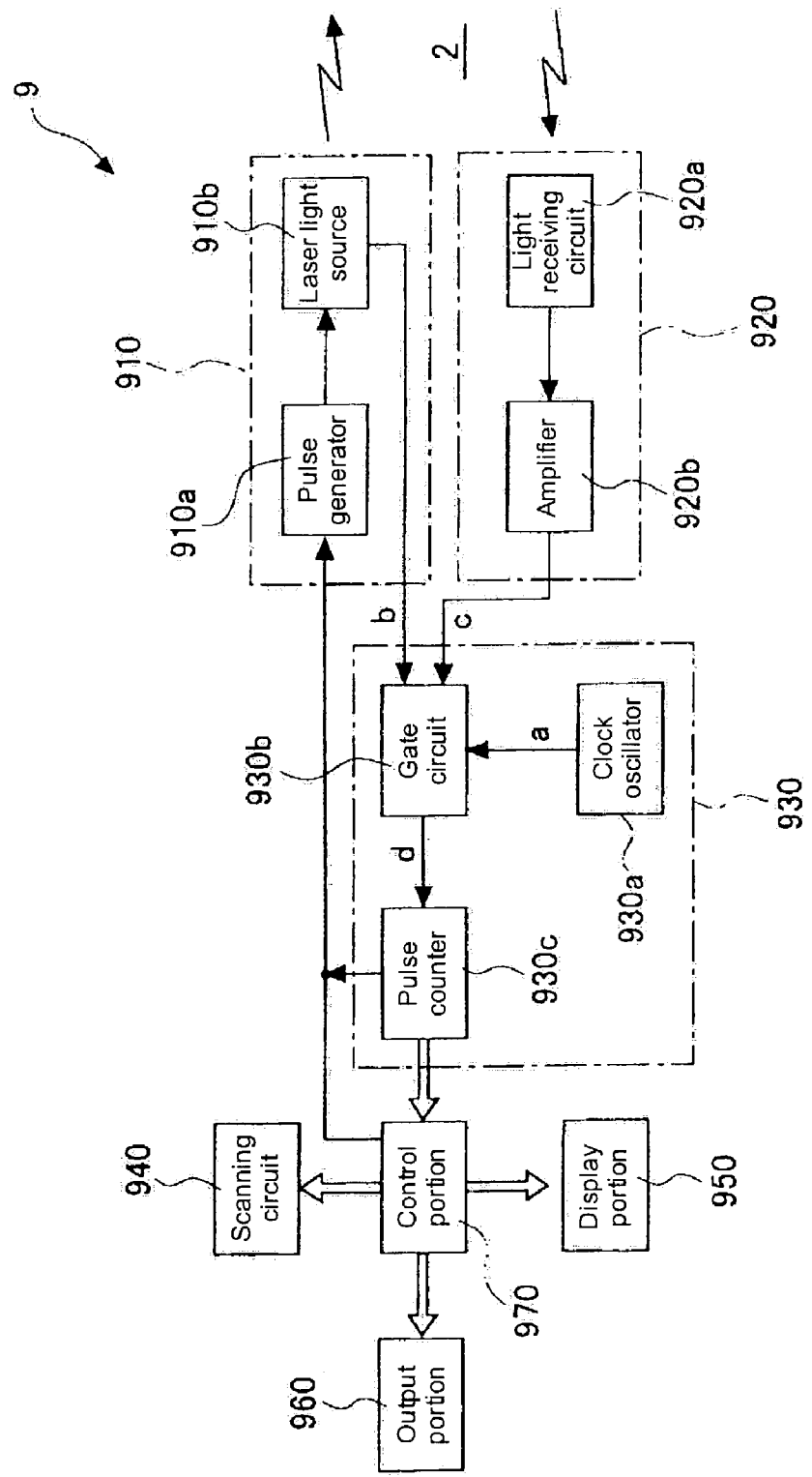
FIG. 5 is a block circuit diagram showing an electric hardware configuration of an optical radar.
Figure 6:
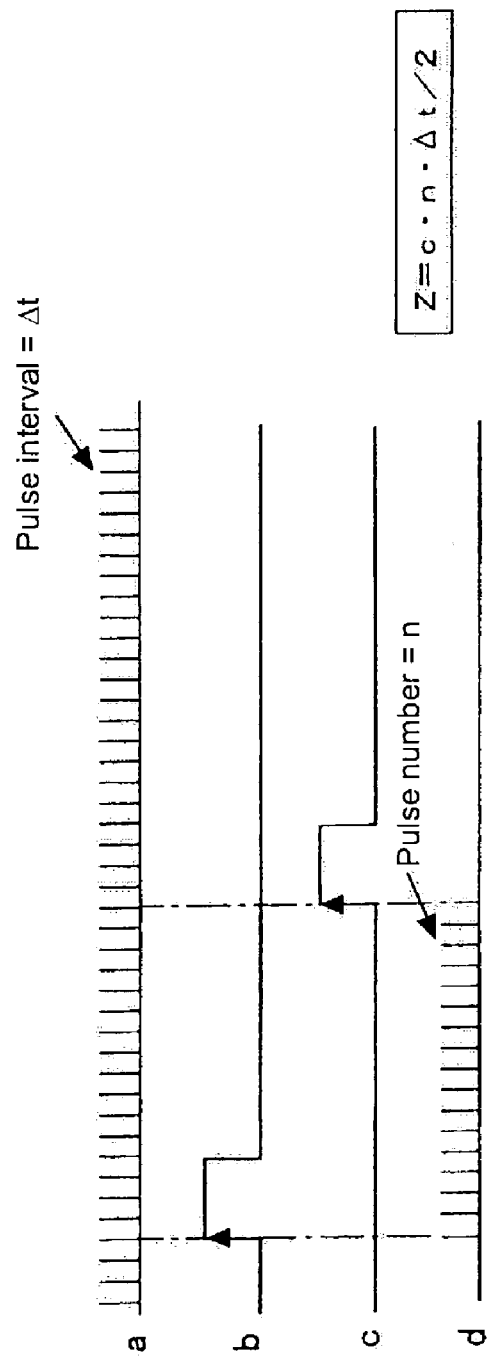
FIG. 6 is a waveform diagram showing signal conditions of respective portions of an optical radar.

A block circuit diagram schematically showing an electric hardware configuration of an optical radar for obtaining distance information is shown in FIG. 5, while a waveform diagram showing signal conditions of respective portions of optical radar is shown in FIG. 6.

As shown in FIG. 5, this optical radar 9 includes a light projecting system circuit 910, a light receiving system circuit 920, a signal processing system circuit 930, a scanning circuit 940, a display portion 950, an output portion 960, and a control portion 970.

The light projecting system circuit 910 outputs light projecting pulse of a certain cycle to determine the lighting timing of the laser light source. Laser light source 910b ejects laser light in synchronization with the light projecting pulse output from a pulse generator 910a. Laser light obtained in this manner is radiated via a scanning mechanism and the like, not illustrated herein to the 3-dimensional monitoring area 2. At this time, a light projecting timing signal b is output from the laser light source 910b in synchronization with the laser light ejecting timing.

The light receiving system circuit 920 includes a light receiving circuit 920a that receives reflected light reflected by an object existing in the 3-dimensional monitoring area 2 to be a monitoring area and converts the reflected light into an electric signal, and an amplifier 920b that amplifies light receiving pulse output from the light receiving circuit 920a. From the amplifier 920b, a light receiving timing signal c is output.

The signal processing system circuit 930 includes a clock oscillator 930a that outputs a clock signal a to be a reference of time measurement, a gate circuit 930b that opens a gate for the period from the arriving timing of the light projecting timing signal b to the arrival of the light receiving timing signal c, and let the clock signal a arriving from the clock oscillator 930a during the period, and generates an elapse time equivalent pulse array d, and a pulse counter 930c that counts the number of pulse array d output from this gate circuit 930b.

An example of relations of clock signal a, light projecting timing signal b, light receiving timing signal c, and elapse time equivalent pulse array d is shown in the waveform diagram in FIG. 6. As seen from the figure, the clock signal a goes through the gate circuit 930b for the limited period from the rise of the light projecting timing signal b to the rise of the light receiving timing signal c, and the elapse time equivalent pulse array d is generated, and the number of pulse n configuring the pulse array d is counted into the pulse counter 930c. The count output data of this pulse counter 930c is processed by the control portion 970 according to the software to be explained in reference to FIG. 7 later herein.

The scanning circuit 940 is for driving the semiconductor resonance mirror 804 shown in FIG. 4 in both horizontal and vertical directions, and these driving actions are carried out according to a command from the control portion 970. The display portion 950 and the output portion 960 are, for example, for displaying or outputting outside the position information of an object obtained as the result of calculations by the control portion 970.

Figure 7:
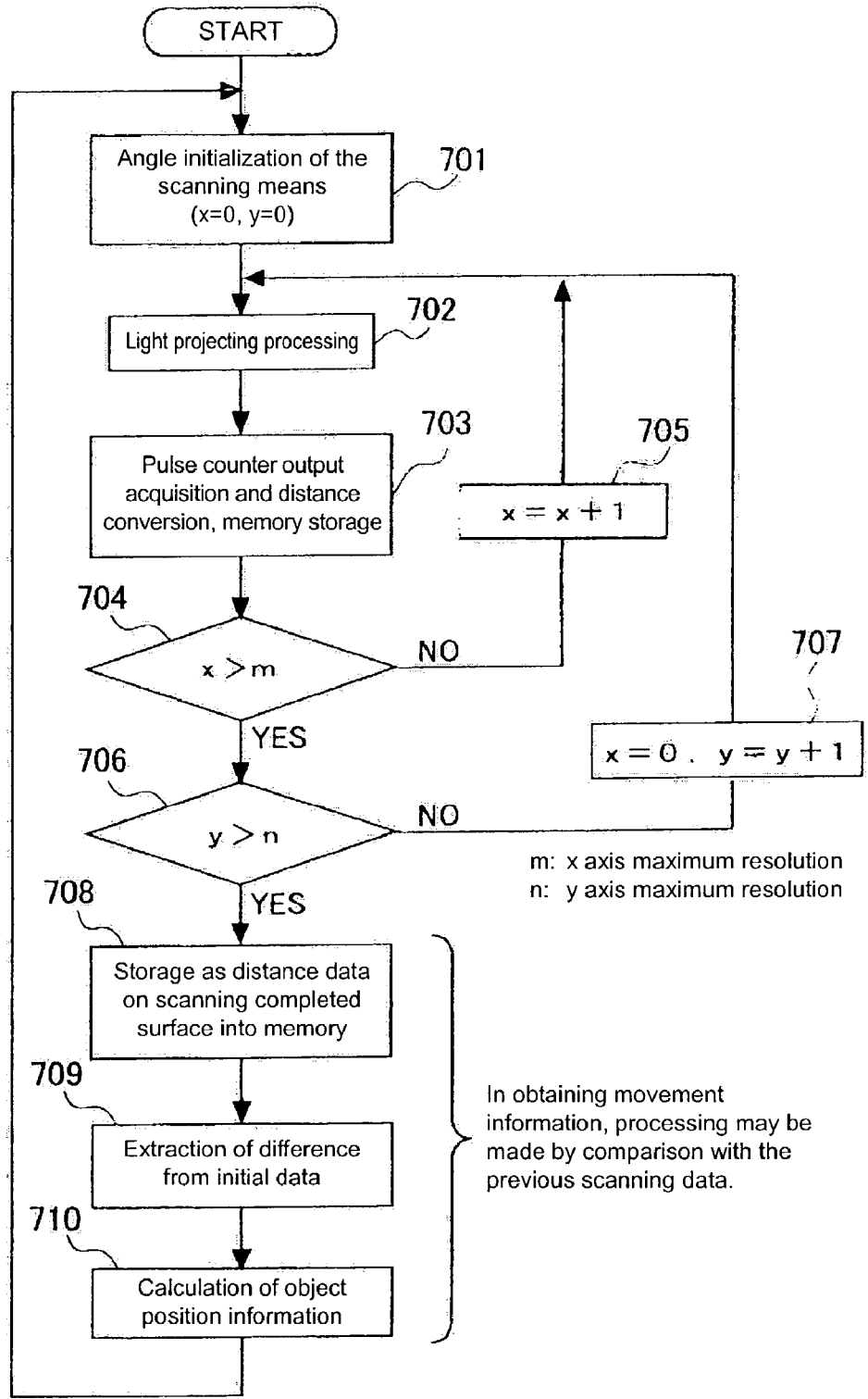
FIG. 7 is a flow chart showing a software configuration of detecting means in the third preferred embodiment.

A flow chart showing a software configuration of detecting means in the third preferred embodiment is shown in FIG. 7. The process shown in this flow chart is carried out by a micro processor configuring the control portion 970.

In FIG. 7, when the processing is started, first, the angle initialization of the scanning means (x=0, Y=0) is carried out (step 701). Herein, x corresponds to the scanning position in the x axis (horizontal axis) direction, while y does to the scanning position in the y axis (vertical axis) direction. The scanning circuit 940 shown in FIG. 5 is driven according to the values of x and y respectively, as a result, the radiation position of laser beam radiated from the semiconductor resonance mirror 804 via the lens 805.

Thereafter, the processing, wherein the value of y is fixed to 0, and the value of x is incremented by +1 (step 705), and light projecting processing (step 702) and light receiving processing (step 703) are carried out, is repeated until the value of x reaches m (step 704 NO). Herein, in the light projecting processing (step 702), in the clock circuit diagram of FIG. 5, by giving a command from the control portion 970 to the light projecting system circuit 910, pulse-shaped laser light is ejected from the laser light source 910b. On the other hand, in the light receiving processing (step 703), output of the pulse counter 930c is taken in, and is converted into a distance, and is stored into a buffer memory.

The above series of light projecting and receiving processes (steps 702, 703, 704, and 705) is repeated by setting the value of x to 0, and incrementing the value of y by +1 (step 707) every time when the value of x reaches m (step 704 YES). In this manner, when the value of y reaches n (step 706 YES), the light projecting and receiving processing for one plane is complete.

Following the, the distance data for one plane stored in the buffer memory is stored as the distance data on the scanning complete surface into a memory for storing the latest data (step 708).

Thereafter, a series of distance data stored as the latest data is compared with initial data previously acquired, and difference extraction processing is carried out (step 709).

Finally, on the basis of the data after difference extraction obtained in the difference extraction processing, the position information of an object in a 3-dimensional monitoring area to be a monitoring area is calculated (step 710). The position information (detection information) of an object obtained as above is output via the output portion 960 to the outside, and is also displayed at the display portion 950.

According to the third preferred embodiment, the radiated laser beam light is irradiated in plane shape, and the distance to a reflected object is measured per unit scanning angle by optical radar method, as a consequence, it is possible to recognize an object in a monitoring objective area in precise and 3-dimensional manner, and on the basis of detection information obtained as mentioned above, it is possible to realize monitoring of an intruding object in various situations at high precision. Further herein, if the scanning means for scanning the laser beam light so as to be irradiated in plane shape includes a semiconductor resonance mirror, since there is few mechanical working parts, it is possible to achieve a longer service life of detecting means.

Next, in the fourth preferred embodiment of a monitor under the present invention, the detecting means 101 includes an optical system including light projecting means for radiating laser slit light, a camera or an image pickup element for monitoring projection lines of the radiated laser slit light, and scanning means for scanning the radiated laser slit light so as to be irradiated in plane shape, and calculating means for obtaining difference between projection line images obtained from the camera or the image pickup element configuring the optical system in a status without the intruding object and projection line images obtained in a status with the intruding object, and thereby the detecting means outputs difference information of the projection line images per scanning angle obtained by the calculating means as the detection information.

Figure 8:
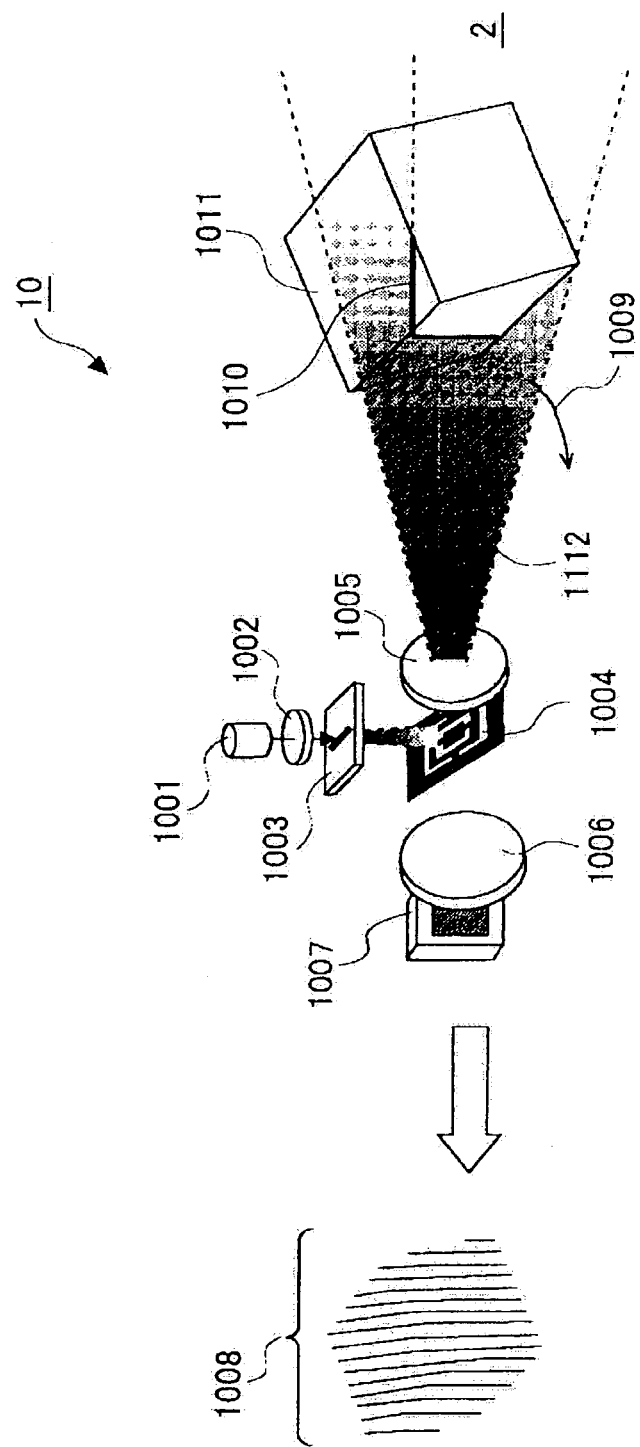
FIG. 8 is a structural diagram showing an optical system of the detecting means in the fourth preferred embodiment.

A structural diagram showing an example of an optical system of the detecting means in the fourth preferred embodiment is shown in FIG. 8. As shown in the figure, this optical system 10 includes a laser light source 1001, a first lens 1002, a slit plate 1003, a semiconductor resonance mirror 1004, a second lens 1005, a third lens 1006, and an image pickup element (CCD image sensor or the similar) 1007.

By the way, in the figure, the code 1008 is a composite slit image obtained by composing images at every light projection obtained from the image pickup element 1007, and the code 1009 is an arrow mark showing the scanning direction of laser slit light, the code 1010 is a projection line of slit light projected onto an object, while the code 1011 is a detected object, and the code 1012 is laser slit light.

In FIG. 8, laser light ejected from the laser light source 1001 is converged by the first lens 1002, then goes through the slit on the slit plate 1003, and is irradiated to the semiconductor resonance mirror 1004. Laser light reflected by the semiconductor resonance mirror 1004 is converged by the second lens 1005, thereafter is radiated as laser slit light 1012 to the 3-dimensional monitoring area 2.

At this time, the plane of the laser slit light 1012 is made vertical in this preferred embodiment. And the semiconductor resonance mirror 1004 shakes its head horizontally in a horizontal plane as shown by the arrow mark shown the code 1009. Therefore, by this head shaking action of the semiconductor resonance mirror 1004, the 3-dimensional monitoring area is scanned in plane shape by the laser slit light 1012. At this time, if there is an object to be detected 1011 in the monitoring object area, a projection line 1010 by the laser slit light is drawn on the surface of the detected object 1011.

On the other hand, the projection line 1010 of the laser slit light on the detected object 1011 is photographed by the image pickup element 1007 via the third lens 1006. The image obtained from the image pickup element 1007 is thereafter composed at every scanning cycle, and thereby the composite slit image 1008 is obtained. On the basis of this composite slit image 1008, through difference extraction processing and so forth, the position information of the object is calculated.

Figure 9:
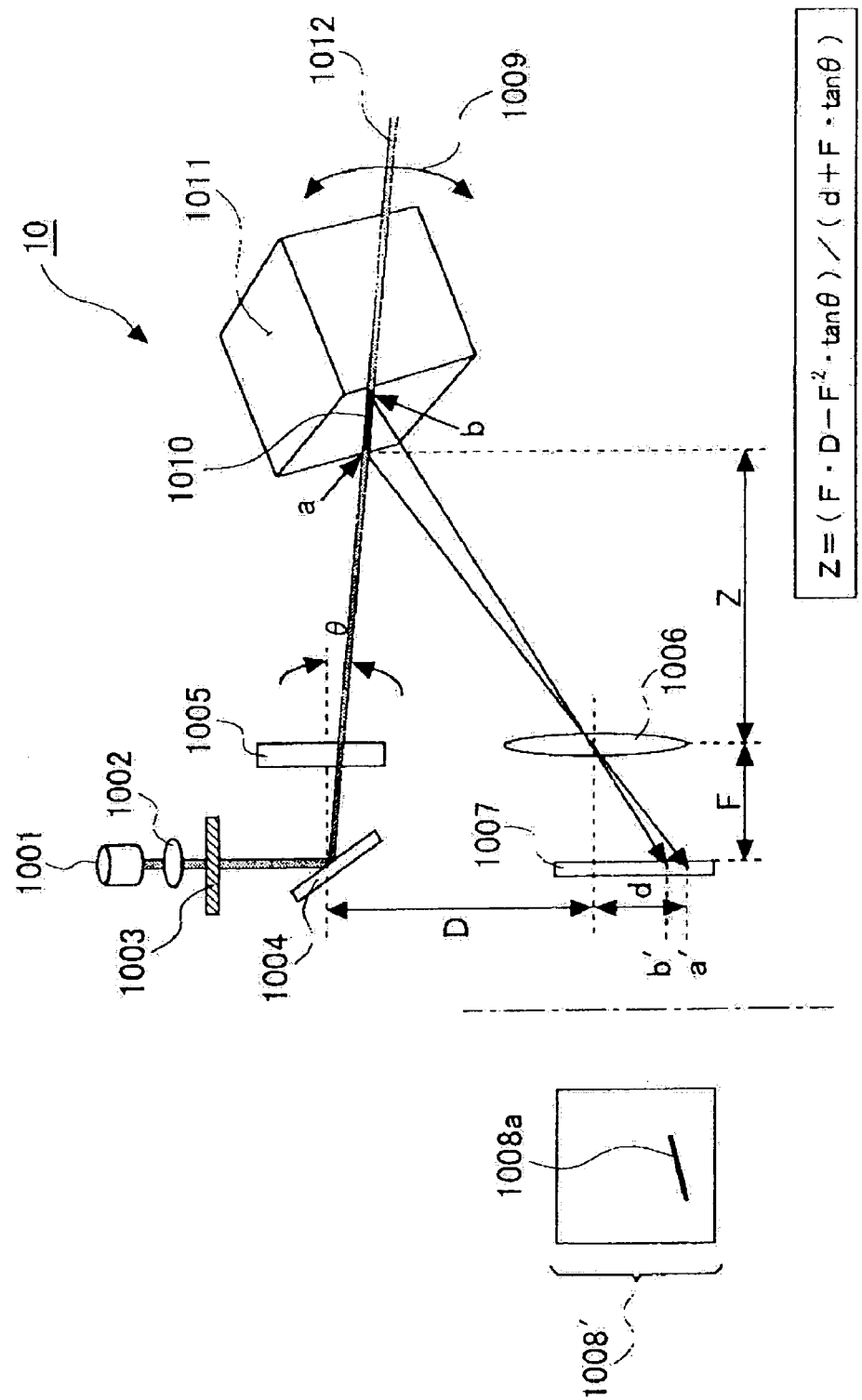
FIG. 9 is an explanatory diagram of distance calculation processing of the detecting means in the fourth preferred embodiment.
Figure 10:
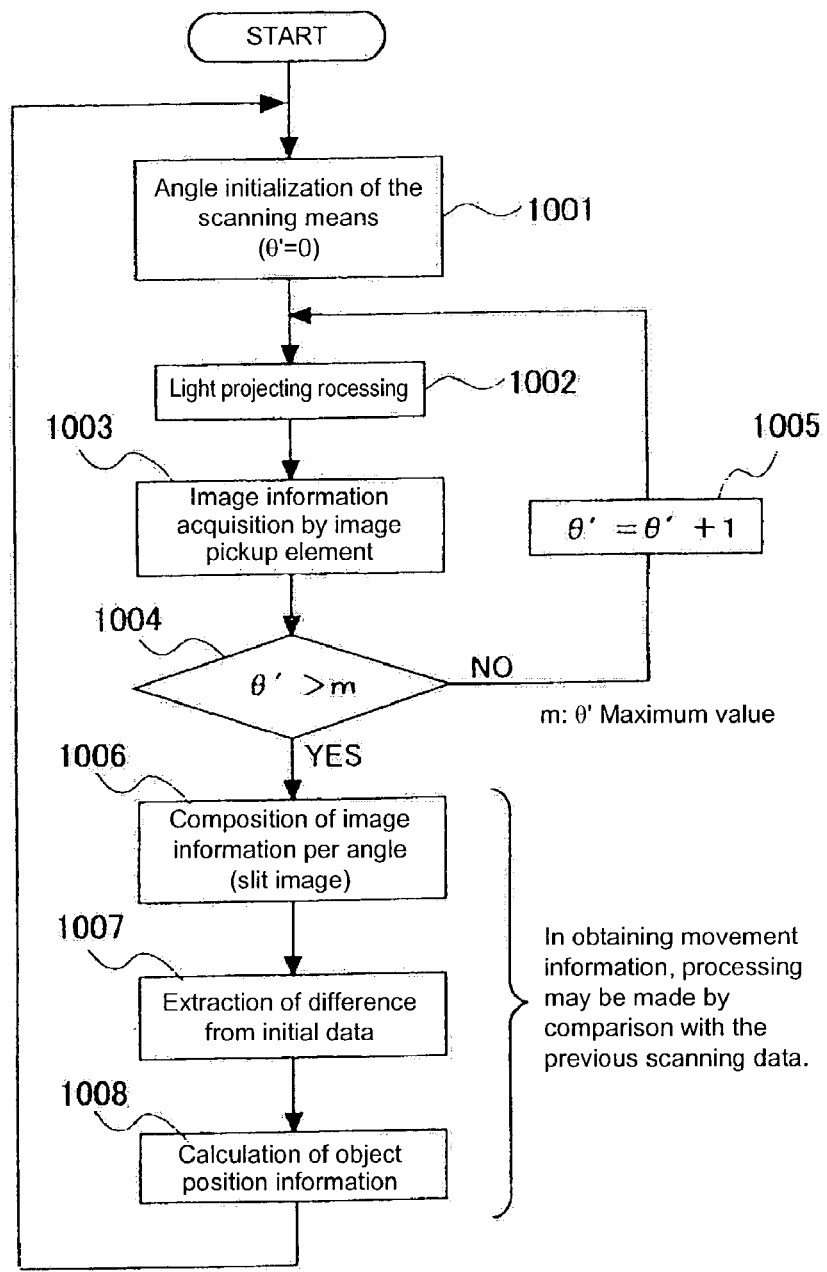
FIG. 10 is a flow chart showing the software configuration of the detecting means in the fourth preferred embodiment.

An explanatory diagram of signal processing (for measurement) of the detecting means in the fourth preferred embodiment is shown in FIG. 9, while a flow chart showing the software configuration thereof is shown in FIG. 10.

In FIG. 10, when the processing is started, first, the angle initialization of the scanning means ($\theta'=0$) is carried out (step 1001). In this initialization processing (step 1001), the value of the scanning angle $\theta'$ is set to 0, thereby the scanning position of the laser slit light 1012 is set at, for example, the end of the scanning range shown by the code 1009.

Thereafter, the processing, wherein the value of the scanning angle $\theta'$ is incremented by +1 (step 1005), and light projecting processing (step 1002) and image pickup processing (step 1003) are carried out, is repeated until the value of the scanning angle $\theta'$ reaches m (step 1004 NO).

At this time, in the light projecting processing (step 1002), the laser light source 1001 is pulse driven, and toward the direction determined at the scanning angle $\theta'$ then, pulse-shaped laser slit light is radiated. On the other hand, in the image pickup processing (step 1003), the image of the projection line 1010 projected on the detected object 1011 is obtained via the image pickup element 1007.

The above light projecting processing (step 1002) and the image pickup processing (step 1003) are stopped when the value of the scanning angle $\theta'$ reaches m (step 1004 YES), and on a memory of a micro computer not illustrated herein, image data 1008' corresponding to the projection line 1010 at every scanning angle is left.

Thereafter, image data per angle obtained as above (projection line image 1008') is composed for one scanning cycle, and thereby the composite slit image 1008 shown in FIG. 8 is obtained (step 1006).

Following the, difference extraction processing between the composite slit image 1008 and initial data previously obtained is carried out (step 1007), thereby whether there is an intruding object in the 3-dimensional monitoring area or not is detected (step 1007).

Thereafter, on the basis of the composite slit image 1008 obtained in the manner, position information of an object is calculated (step 1008).

An explanatory diagram of distance calculation processing for calculating the position information of an object is shown in FIG. 9. By the way, in FIG. 9, identical codes are allotted to the same structural components in FIG. 8, and explanations thereof are omitted herein.

As shown in FIG. 9, in this optical system, the optical axis of the second lens 1005 and the optical axis of the third lens 1006 are arranged in parallel with each other, and the distance between these optical axes is set as D. And the angle between the optical axis of the second lens and the optical axis of the slit light 1012 is set as θ, the focal distance of the third lens 1006 is set as F, the maximum approach point of the projection line 1010 of the slit light formed on the detected object 1011 is set as a, the farthest point thereof is set as b, and the distance between the third lens 1006 and the maximum approach point a is set as Z. Further, on the light receiving surface of the image pickup element 1007, an image of the projection line 1010 is formed in-between the point a' and the point b', and the distance between the image forming point a' on the image pickup element corresponding to the maximum approach point a and the optical axes is set as d.

Under the preconditions mentioned above, by the principle of triangulation, the distance between the third lens 1006 and the maximum approach point a may be obtained by use of the following equation.

$$Z=(F \cdot D-F^2 \cdot \tan \theta)/(d+F \cdot \tan \theta) \quad (2)$$

According to the fourth preferred embodiment described above, laser slit light is irradiated in plane shape, and an intruding object is monitored on the basis of deformation in projection line images thereof, therefore, even though only a camera or an image pickup element is employed, by making characteristics of a monitoring objective tangible into deformation of slit light projection lines, it is possible to reduce image processing load, and to realize highly precise monitoring of an intruding object. Moreover, since scanning traces of scanning means may be made by simple reciprocating linear movement, control on a scanning mechanism may become simpler and easier accordingly.

Next, in the fifth preferred embodiment of a monitor under the present invention, the detecting means 101 includes an optical system including light projecting means for radiating laser slit light, a camera or an image pickup element for monitoring projection lines of the radiated laser slit light, and scanning means for scanning the radiated laser slit light so as to be irradiated in plane shape, and calculating means for calculating the maximum approach point among the projection line images of the slit light taken in from the camera or the image pickup element configuring the optical system, and thereby the detecting means outputs maximum approach point information obtained per scanning angle from the calculating means as the detection information.

Figure 11:
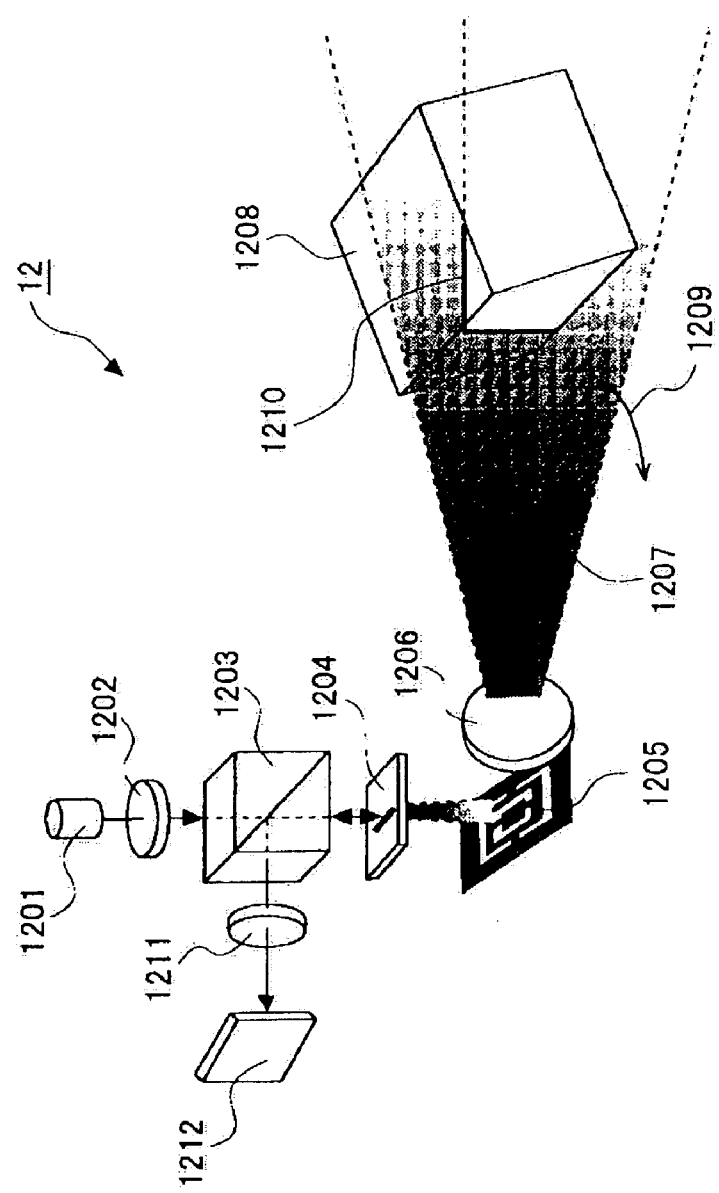
FIG. 11 is a structural diagram showing an optical system in the detecting means in the fifth preferred embodiment.

A structural diagram showing an example of an optical system in the detecting means in the fifth preferred embodiment is shown in FIG. 11. As shown in the figure, this optical system 12 includes a laser light source 1201, a first lens 1202, a beam splitter 1203, a slit plate 1204, a semiconductor resonance mirror 1205, a second lens 1206, a third lens 1211, and an image pickup element 1212. By the way, in the figure, the code 1207 is laser slit light, 1208 is an object to be detected, 1209 is an arrow mark showing the scanning direction, and the code 1210 is a projection line of slit light formed on the detected object 1208.

Laser light ejected from the laser light source 1201 is converged by the first lens 1202, then goes straight through the beam splitter 1203, and thereafter is converted into slit light via the slit plate 1204, and then is irradiated to the semiconductor resonance mirror 1205. Slit light reflected by the semiconductor resonance mirror 1205 is reformed by the second lens 1206, thereafter is radiated as laser slit light 1207 to a 3-dimensional monitoring area to be a monitoring area. At this time, in the same manner as above, the semiconductor resonance mirror 1205 shakes its head horizontally in a horizontal plane. At this time, the place that the slit light 1207 forms is vertical. Therefore, in synchronization with the horizontal head-shaking action of the semiconductor resonance mirror 1205, the laser slit light 1207 is also scanned horizontally in head-shaking manner as shown in the code 1209, thereby, plane-shaped scanning to the monitoring objective area is realized.

On the other hand, laser light reflected by the surface of the detected object 1208 is returned via the second lens 1206 and the semiconductor resonance mirror 1205 to the slit plate 1204, and further returned through the slit of the slit plate 1204 to the beam splitter 1203, where laser light is branched, and further laser light goes through the third lens 1211, and is irradiated to the light receiving surface of the image pickup element (CCD image sensor or the similar). Image data obtained from the image pickup element 1212 is taken into a micro computer not illustrated herein, and a specific image processing is carried out, as a result, position information of the object is calculated.

Figure 12:
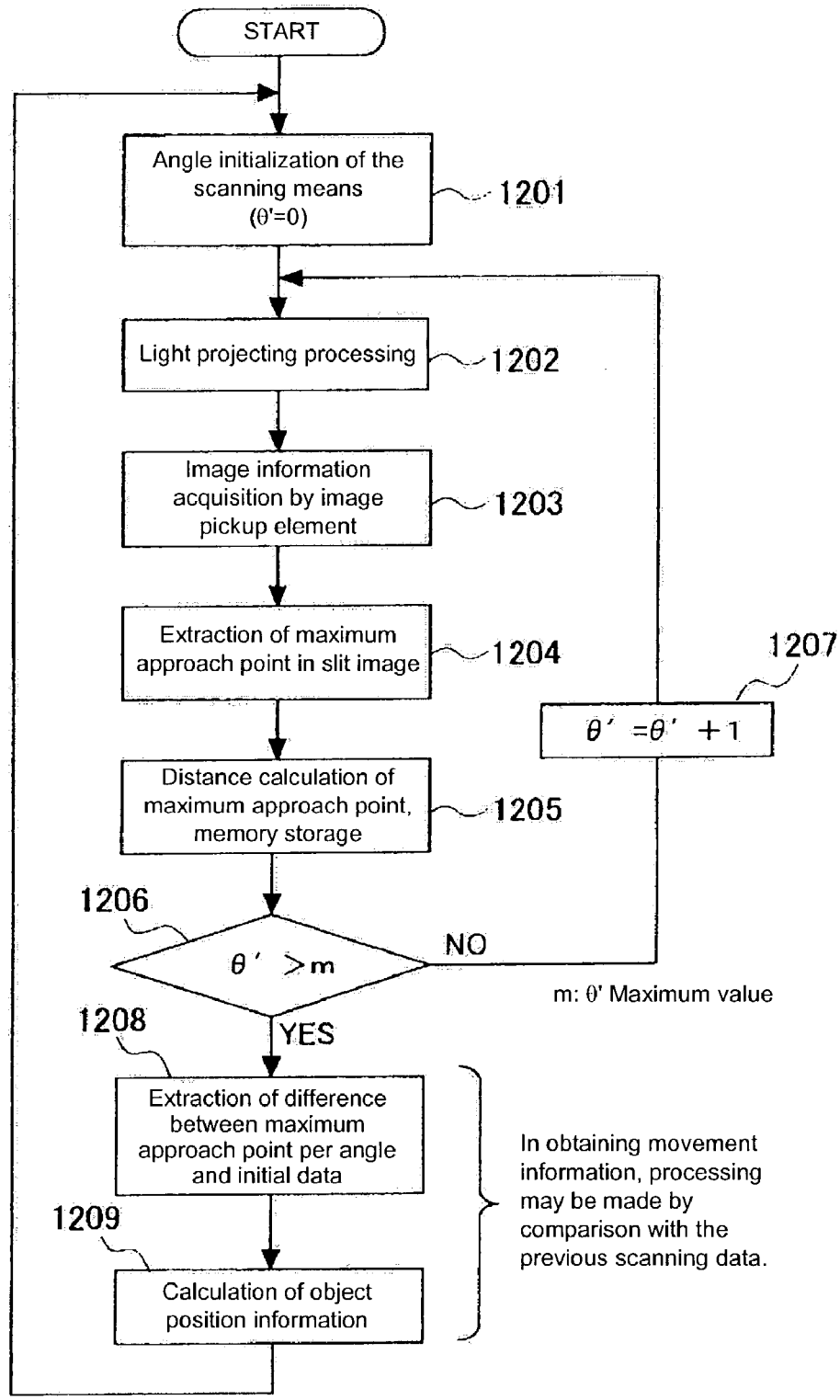
FIG. 12 is a flow chart (No. 1) showing a software configuration of the detecting means in the fifth preferred embodiment.

A flow chart (No. 1) showing a software configuration of detecting means in the fifth preferred embodiment is shown in FIG. 12. By the way, the process shown in this flow chart is carried out by a micro processor configuring the micro computer mentioned previously.

In FIG. 12, when the processing is started, first, the angle initialization of the scanning means (θ'=0) is carried out (step 1201). As mentioned previously, in this initialization processing (step 1201), the value of the scanning angle θ' is set to 0, thereby the radiating direction of the slit light 1207 is set at the reference position in the scanning range shown by the code 1209 in FIG. 11.

Following the, the processing, wherein the value of the scanning angle θ' is incremented by +1, and light projecting processing (step 1202) and image pickup processing (step 1203), maximum approach point extraction processing (step 1204), and distance calculation processing (step 1205) are carried out, is repeated until the value of the scanning angle θ' reaches m (step 1206 NO).

At this time, in the light projecting processing (step 1202), in the same manner as in the circuit structure explained previously in reference to FIG. 5, the laser light source 1202 is pulse driven, and laser slit light is radiated in pulse shape to the 3-dimensional monitoring area to be a monitoring area. And in the image information pickup processing (step 1203), the image data photographed at the scanning angle concerned is taken in from the image pickup element 1212. And, in the maximum approach point extraction processing (step 1204), as explained previously in reference to FIG. 9, the maximum approach point a' in a slit image is extracted. And, in the distance calculation processing (step 1205), as explained previously in reference to FIG. 9 in the same manner, by use of a specific calculating equation, the distance Z to the maximum approach point a is obtained, and this value Z is stored into a buffer area on memory.

In the manner mentioned above, when the storage of a series of data for one scanning cycle is completed (step 1206 YES), then the difference extraction processing is carried out, and thereby difference with initial data at the maximum approach point at each angle is extracted (step 1208).

Thereafter, on the basis of difference data obtained in the manner, position information of an object is calculated (step 1209) namely, if there is an intruding object in a 3-dimensional monitoring area to be a monitoring area, distance information between the intruding object and the maximum approach point of the monitor and so forth are obtained.

The distance information of the maximum approach point obtained in this manner is supplied to various object monitoring algorithms, and further may be output as analog data to the outside.

Flow charts showing the signal processing of detecting means in the fifth preferred embodiment are shown in FIGS. 13A and 13B. The processing shown in this flow chart is for outputting the distance information obtained via the processing shown in the flow chart in FIG. 12 as corresponding analog voltage to the outside.

This signal processing consists of a scaling processing for regulating the output voltage (steps 1301–1304) and a conversion processing for converting the detection distance into an appropriate output voltage (steps 1311–1314). When the scaling processing is started, first s setting processing of the maximum approach point is carried out (step 1301), thereafter a conversion processing into a voltage level corresponding to the maximum approach point is carried out (step 1302), and then a setting processing of the farthest point is carried out (step 1403), then a conversion processing of the farthest point into a voltage level is carried out (step 1404). Through these processes, scaling is completed so that the distance from the maximum approach point to the farthest point should be set in a specific voltage range.

On the other hand, at the side of the voltage conversion processing, first, monitoring data is taken in from the detecting means (step 1311), and on the basis thereof, the calculation processing of the maximum approach distance explained in FIG. 9 is carried out (step 1312), then a calculation from the scaling setting to the voltage level is carried out (step 1313), and finally the voltage after conversion is output (step 1314). In this manner, when the distance to an intruding object is detected through the detecting means, in this preferred embodiment, an analog voltage corresponding to the distance is output.

Figure 14:
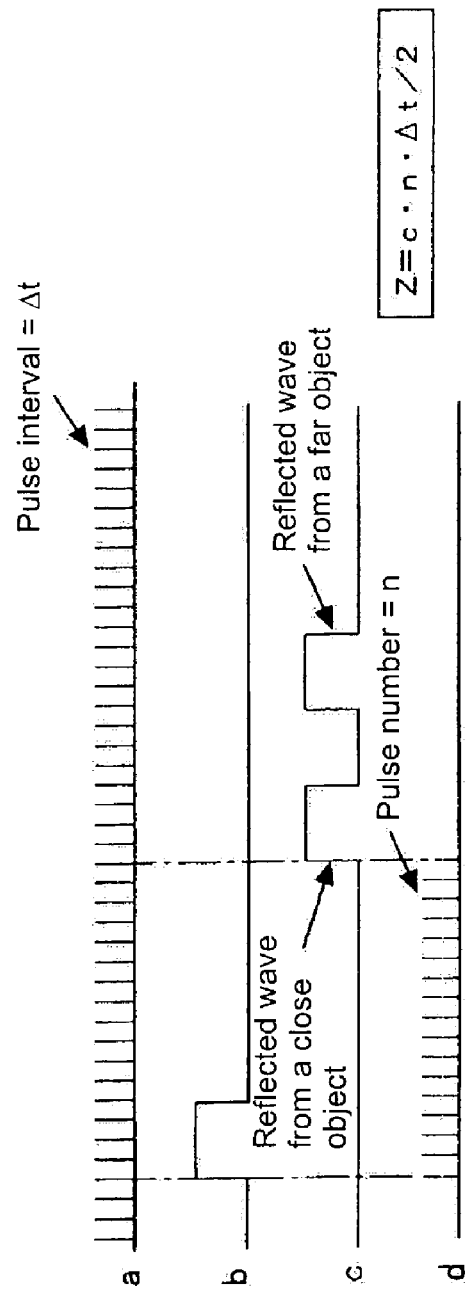
FIG. 14 is a waveform diagram showing signal processing of the detecting means in a modified example of the fifth preferred embodiment.
Figure 15:
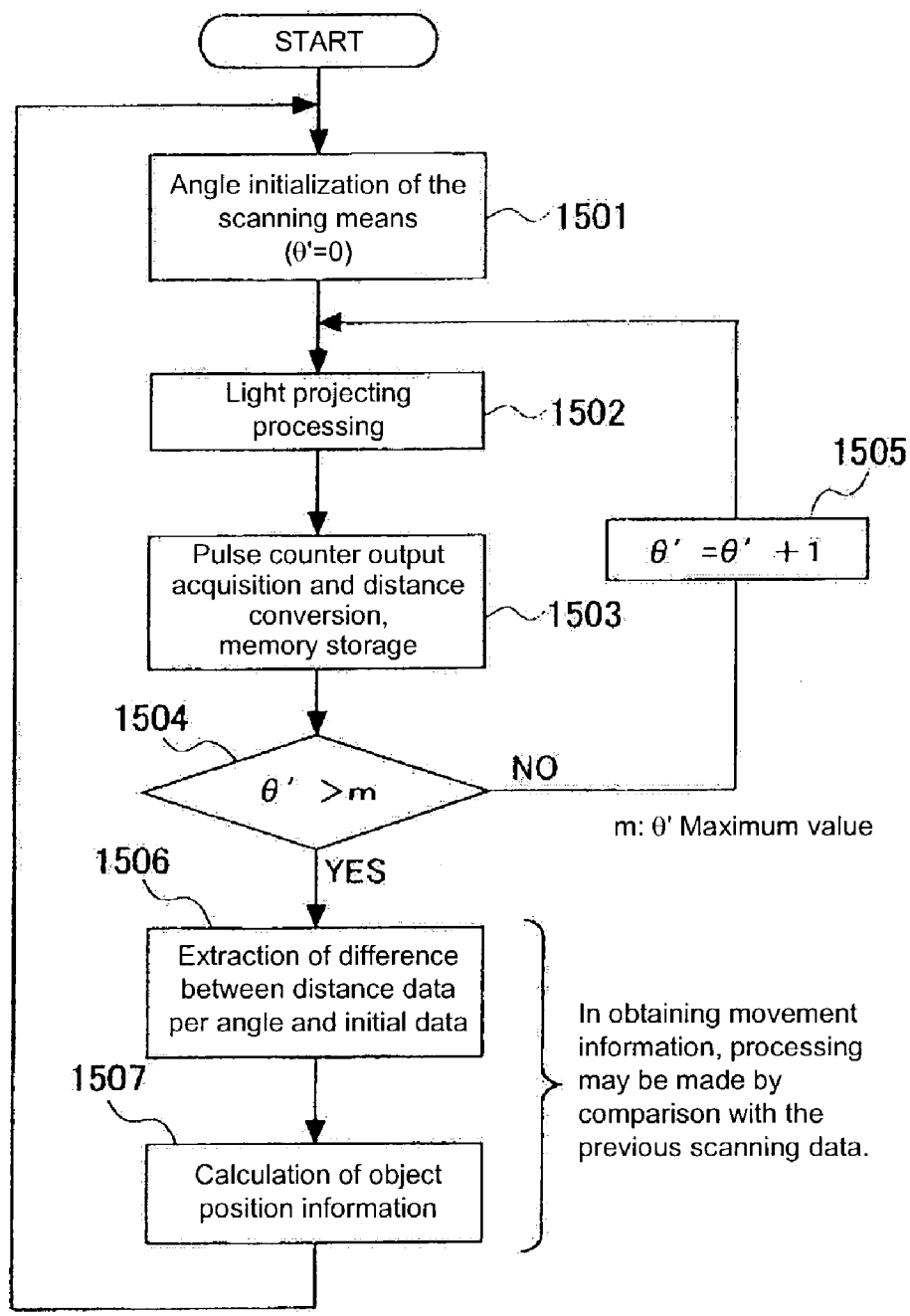
FIG. 15 is a flow chart (No. 2) showing a software configuration of the detecting means in the modified example of the fifth preferred embodiment.

Next, a waveform diagram showing signal processing of the detecting means in a modified example of the fifth preferred embodiment is shown in FIG. 14, and a flow chart (No. 2) showing a software configuration of detecting means in the modified example of the fifth preferred embodiment is shown in FIG. 15. The modified example to be explained in reference to these figures is on the assumption of the circuit structure of the light radar explained in FIG. 15. And the difference from the basic example of the fifth preferred embodiment is that the maximum approach point on the projection line is not calculated on the basis of the image data obtained from the image pickup element, but the distance to the maximum approach point on the projection line is directly obtained by a laser radar, and on the basis thereof, the position information of an object is calculated.

In a modified example according to the fifth preferred embodiment, the detecting means 101 includes a coaxial optical system including light projecting means for radiating laser slit light in pulse shape, light receiving means for receiving reflected light of the radiated laser slit light reflecting on an object and coming back, and scanning means for scanning the radiated laser slit light so as to be irradiated in plane shape, and measuring means for obtaining the maximum approach distance among distances to respective points of the laser slit light per unit scanning angle by optical radar method on the basis of the difference between light projection time and light receiving time of the laser slit light, and thereby the detecting means outputs maximum approach distance information obtained per scanning angle by the measuring means as the detection information.

As is apparent in reference to FIG. 5 and FIG. 14, when laser slit light 1207 is radiated in pulse shape to the object to be detected 1208 as shown in FIG. 11, reflected lights occur from respective points on the projection point 1210, and these reflected lights come back in order of closer objects. This phenomenon is shown in the waveform diagram in FIG. 14.

As is apparent from the figure, the pulse of the light receiving timing signal c that arrives first in waiting time following the light projecting timing signal b corresponds to a reflected wave from the closest object. Therefore, if the time to the pulse that arrives first on the light receiving timing signal c is counted with the clock signal a as a reference, it is possible to obtain count data equivalent to the distance to the maximum approach point, in each point on irradiation point by the laser slit light at every irradiation angle of the laser slit light.

On the assumption of the, in a micro computer configuring the control portion 970, when the processing shown in FIG. 15 is carried out, it is possible to easily obtain the distance to the maximum approach point at every scanning angle, without using a complicated image processing, and on the basis thereof, it is possible to calculate position information and actions of an object in a swift manner.

Namely, when the processing is started in FIG. 15, first, the angle initialization of the scanning means ($\theta'=0$) is carried out (step 1501).

Following the above, the processing, wherein the value to determine the scanning angle $\theta'$ is incremented by +1, and light projecting processing (step 1502) and light receiving processing (step 1503) are carried out, is repeated until the value of $\theta'$ reaches m (step 1504 NO).

Herein, as explained previously, in the light projecting processing (step 1502), the laser light source is pulse driven, and laser slit light is radiated in pulse shape to a direction determined by the scanning angle at the moment. And in the light receiving processing (step 1503), count data obtained from laser radar is taken in, and is converted into a distance, which is stored into a buffer memory.

At this time, in this preferred embodiment, the distance data obtained by distance conversion corresponds to the distance to the maximum approach point in each point on the projection line on an object by radiated slit light. Namely, in this modified example of the preferred embodiment, wherein the distance is not obtained through calculation processing of image data obtained from the image pickup element like in the basic example of the fifth preferred embodiment, as a result, calculation processing for obtaining the maximum approach distance is simplified and high speed response is realized.

Then, difference between the distance data per angle and the initial data is extracted (step 1506), and on the basis of data after this difference extraction, calculation of position information of an object is carried out (step 1507).

As explained above, according to the modified example of the fifth preferred embodiment, from a light radar configuring the detecting means, count value data equivalent to the distance to the maximum approach point in each point on the projection line of slit light may be obtained directly, accordingly, when to obtain the distance to the maximum approach point via the detecting means, high speed response is realized, and further the configuration of processing program in a micro computer may be simplified.

According to the modified example of the fifth preferred embodiment, since the radiated laser slit light is irradiated in plane shape, and the maximum approach point is calculated per unit scanning angle on the basis of deformation of the projection lines thereof, in addition to the advantage of the basic example of fifth preferred embodiment, the speed and precision in acquiring the maximum approach point information may be improved, and response speed may be further improved. In other words, since radiated slit laser light is irradiated in plane shape, and the maximum approach point at unit scanning angle is calculated on the basis of deformation of the projection line thereof, in addition to the advantages of the fourth preferred embodiment, by extracting information of only the maximum approach point from the detecting means, processes at later stages may be simplified more than the case of processing the entire image data, and response speed may be improved.

In the sixth preferred embodiment, the detecting means includes an optical system including light projecting means for radiating laser slit light in pulse shape, a photo diode array for receiving reflected light of the radiated laser slit light reflecting on an object and coming back, and scanning means for scanning the radiated laser slit light so as to be irradiated in plane shape, and measuring means for measuring the distance to a reflected object per unit scanning angle by optical radar method on the basis of the difference between light projection time and light receiving time of the laser slit light, and thereby the detecting means outputs distance information to each point on the projection lines measured per scanning angle by the measuring means as the detection information.

Figure 16:
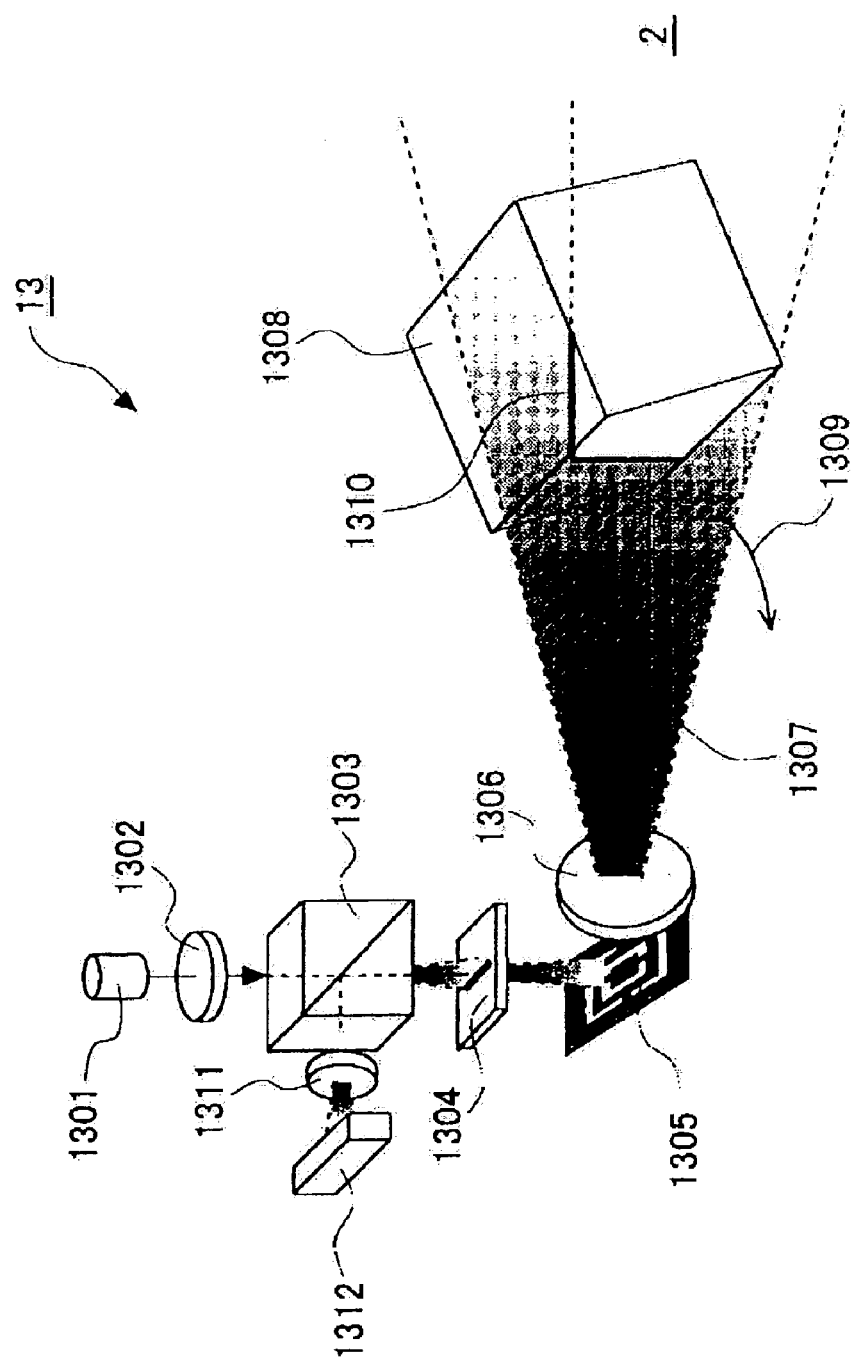
FIG. 16 is a structural diagram showing an optical system of the detecting means in the sixth preferred embodiment.
Figure 17:
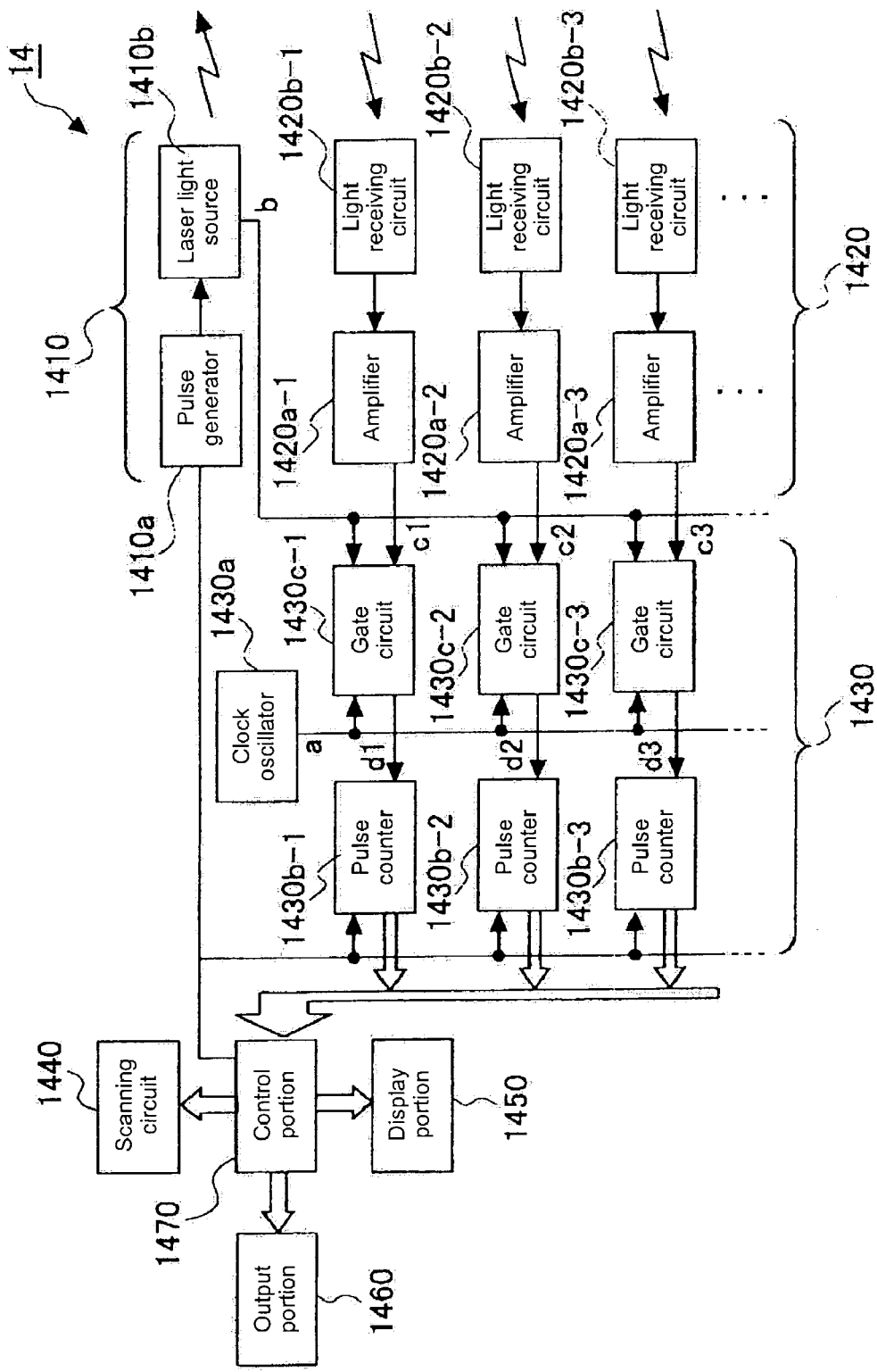
FIG. 17 is a block circuit diagram showing the signal processing of the detecting means in the sixth preferred embodiment.
Figure 18:
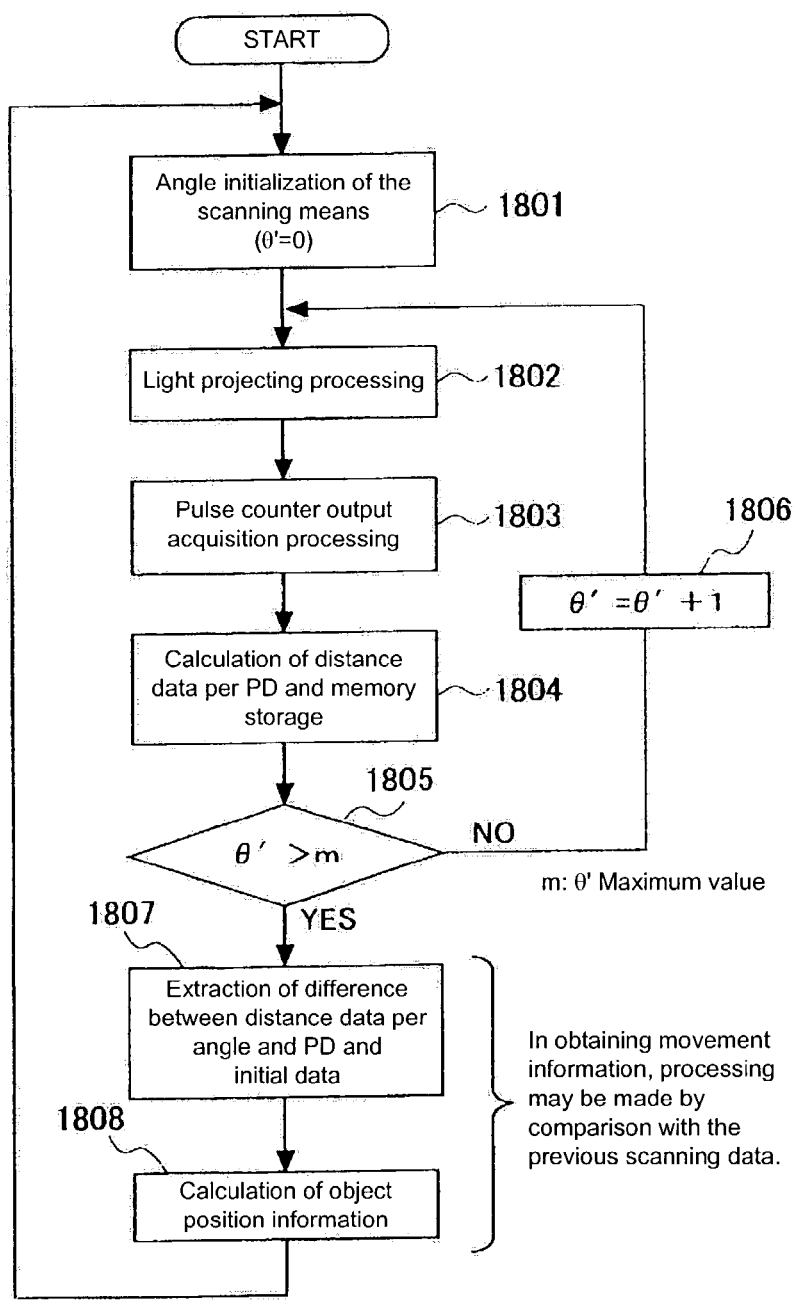
FIG. 18 is a flow chart showing a software configuration of the detecting means in the sixth preferred embodiment.

A structural diagram showing an example of an optical system of the detecting means in the sixth preferred embodiment is shown in FIG. 16, and a block circuit diagram showing the signal processing of the detecting means in the sixth preferred embodiment is shown in FIG. 17, while a flow chart showing a software configuration of detecting means in the sixth preferred embodiment is shown in FIG. 18.

As shown in FIG. 16, this optical system includes a laser light source 1301, a first lens 1302, a beam splitter 1303, a slit plate 1304, a semiconductor resonance mirror 1305, a second lens 1306, a third lens 1311, and a photo diode array 1312. By the way, in the figure, the code 1307 is laser slit light, 1308 is an object to be detected, 1309 is an arrow mark showing the scanning direction, and the code 1310 is a projection line of slit light projected onto the detected object 1308.

Laser light ejected from the laser light source 1301 is converged by the first leans 1302, then goes straight through the beam splitter 1303, and is reformed into slit light via the slit plate 1304, and is irradiated to the semiconductor resonance mirror 1305. Laser light reflected by the semiconductor resonance mirror 1305 is further reformed by the second lens 1306, thereafter is radiated as laser slit light 1307 to the 3-dimensional monitoring area 2 to be a monitoring area.

At this time, the semiconductor resonance mirror 1305 shakes its head horizontally in a horizontal plane, and the plane that the laser slit light 1307 forms is vertical. Therefore, by this head shaking action of the semiconductor resonance mirror 1305 in horizontal direction as shown by the arrow mark 1309, the 3-dimensional monitoring area to be a monitoring area is scanned in plane shape. And if there is an object to be detected 1308 in the monitoring area, a irradiation line 1310 by the laser slit light is drawn on the surface of the detected object.

Laser light reflected by the surface of the detected object 1308 is returned via the second lens 1306 and the semiconductor resonance mirror 1305 and the slit plate 1304 to the beam splitter 1303, and thereafter is branched to perpendicular, and further laser light goes through the third lens 1311, and is irradiated to each light receiving element on the photo diode array 1312. At this time, the array direction of light receiving elements configuring the photo diode array 1312 is aligned with the direction of the slit light projection line 1310 on the object 1308. Accordingly, to each of the light receiving elements configuring the photo diode array 1312, reflected light at each point of the cross sectional line that slit light forms arrives.

A block circuit diagram showing the signal processing of the detecting means in the sixth preferred embodiment is shown in FIG. 17. As shown in the figure, this laser radar 14 includes a light projecting system circuit 1410, a light receiving system circuit 1420, a signal processing system circuit 1430, a scanning circuit 1440, a display portion 1450, an output portion 1460, and a control portion 1470.

The light projecting system circuit 1410 includes a pulse generator 1410a driven at a command from the control portion 1470, and a laser light source 1410b that carries out light emitting action at receipt of cyclic light projection pulse output from the pulse generator 1410a. From this laser light source 1410b, a light projection timing signal b is output in synchronization with the light emitting timing.

The light projecting system circuit 1420 includes light receiving circuits 1420b-1–1420b-n that receive laser light reflected by an object and returned and convert laser light into an electrical signal, and amplifiers 1420a-1–1420a-n that amplify the light receiving pulse output from the light receiving circuits. And from the amplifiers 1420a-1–1420a-n, light receiving timing signals c1–cn equivalent to the light receiving timing in a photo diode configuring each light receiving circuit are output.

The signal processing system circuit 1430 includes a clock oscillator 1430a, pulse counters 1430b-1–1430b-n, and gate circuits 1430c-1–1430c-n.

From the clock oscillator 1430a, a clock signal a to be a time reference is output. Gate circuits 1430c-1–1430c-n open gates at receipt of the light projecting timing signal b output from the laser light source 1410b configuring the light projecting system circuit 1410. Thereafter, gate circuits 1430c-1–1430c-n close gates at receipt of the light receiving timing signals c1–cn output from the amplifiers 1420a-1–1420a-n. The clock signal output from the clock oscillator 1430a goes through the gate circuits 1430c-1–1430c-n, and is supplied to pulse counters 1430b-1–1430b-n. The pulse counters 1430b-1–1430b-n count pulse arrays d1–dn output from the gate circuits 1430c-1–1430c-n. As a result, in each pulse counter configuring the pulse counters 1430b-1–1430b-n, a count value equivalent to the distance to each point on the cross sectional line of the projected slit light. Count values of the pulse counters 1430b-1–1430b-n obtained in this manner are taken into a micro computer configuring the control portion 1470, and calculation on position information of an object is carried out via software to be described later herein.

By the way, as explained previously, the scanning circuit 1440 is the circuit for shaking the head of the semiconductor resonance mirror 1305 shown in FIG. 16, and the display portion 1450 is for displaying data generated by the control portion 1470, and the output portion 1460 is for outputting the detection information generated by the control portion 1470 to the outside.

According to the circuit structure explained above, in a micro computer configuring the control portion 1470, it is possible to take in distance information at each point on the cross sectional line of radiated slit light in bulk.

A flow chart showing a software configuration of detecting means in the sixth preferred embodiment is shown in FIG. 18. By the way, the process shown in this flow chart is carried out by a micro processor of a micro computer configuring the control portion 1470.

In FIG. 18, when the processing is started, first, the angle initialization of the scanning means (θ'=0) is carried out (step 1801). Thereafter, the processing, wherein the value of θ' to regulate the scanning angle is incremented by +1, and light projecting processing (step 1802), counter output taking processing (step 1803), and light receiving element distance data calculating processing (step 1804) are carried out one after another, is repeated until the value of θ' reaches m (step 1805 NO).

Herein, the light projecting processing (step 1802) is, as explained previously, the process wherein the light projecting system circuit 1410 is driven, thereby laser light is ejected in pulse shape from the laser light source 1410b in FIG. 17. The counter data taking processing (step 1803) is the process for taking in count data from each pulse counter configuring the pulse counters 1430b-1–1430b-n. While, the light receiving element distance data calculating processing (step 1804) is the process for calculating distance data per each light receiving element (photo diode) taken in from the pulse counters 1430b-1–1430b-n, and storing this distance data into a buffer memory not illustrated herein. Then, when the value of θ' reaches m (step 1805 YES), this series of processes (steps 1802–1804) is complete, and the process shifts to a specified calculation processing.

First, at the start of the calculation processing, difference extraction processing between the distance data per angle and photo diode is carried out (step 1807), thereby whether there is an intruding object in a 3-dimensional monitoring area to be a monitoring area or not is made clear.

Following the above, on the basis of the difference extraction data, calculation of position information of an object is carried out by a specific algorithm (step 1808).

According to the sixth preferred embodiment, the radiated laser slit light in pulse shape is irradiated in plane shape, and distance information to each of a series of points along the projection lines per unit scanning angle is obtained by optical radar method on the basis of deformation of the projection lines thereof, and thereby the situations in the monitoring objective area are recognized in a 3-dimensional manner, monitoring may be made with high speed response and at high precision on the basis of detection information obtained in this manner.

Explanations heretofore have been made on a monitor according to the present invention mainly with the structure of detecting means 101, while the monitor 1 under the present invention is characterized also by the setting means 102, the monitoring information generation means 103, and the external output means 104 thereof. Therefore, other various characteristics of the monitor 1 according to the present invention are explained hereinafter.

Figure 19:
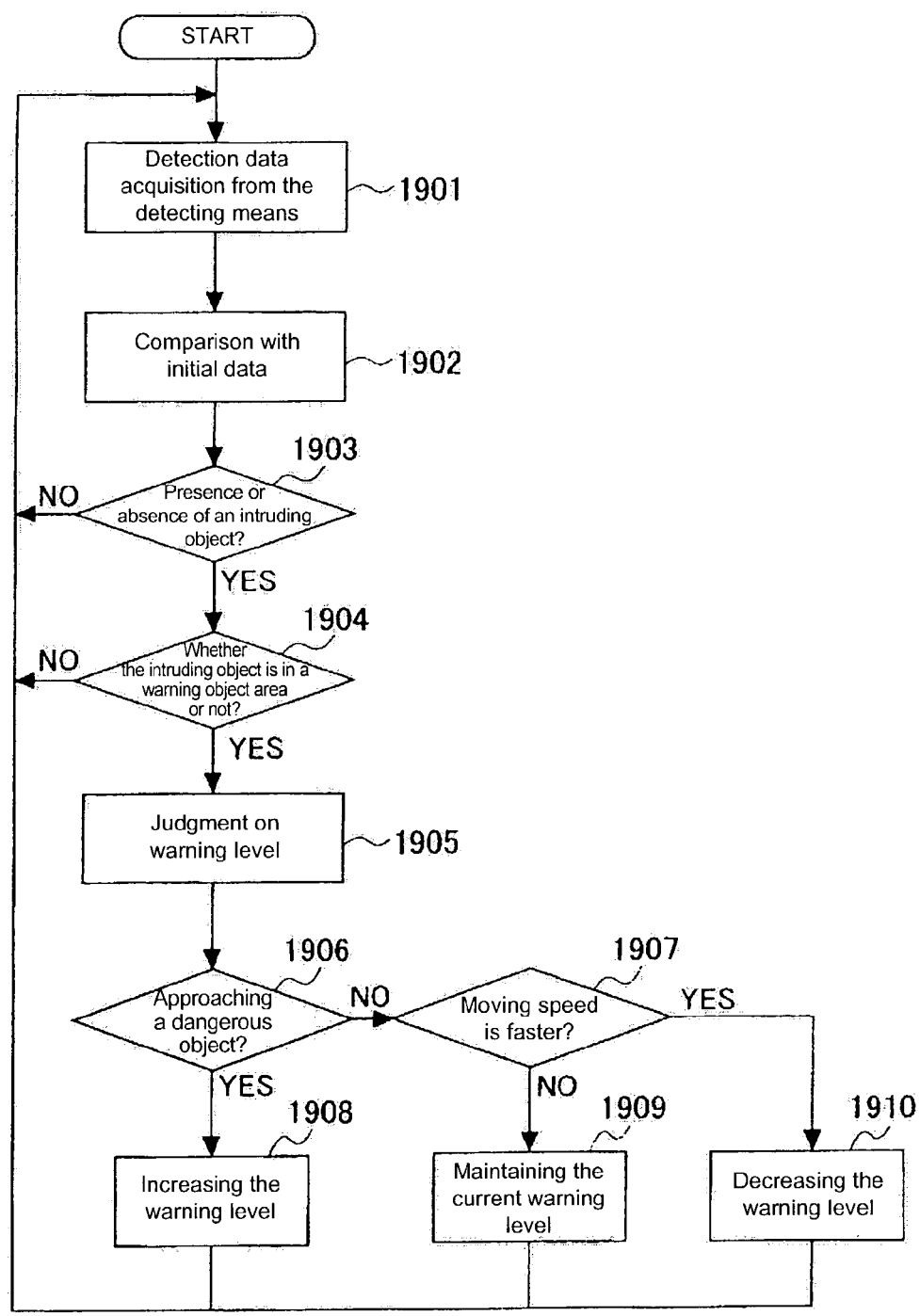
FIG. 19 is a flow chart showing an example of a series of detection of an intruding object, processing of detection information, and external output in a monitor.

A flow chart showing an example of a series of-detection of an intruding object, processing of detection information, and external output in a monitor is shown in FIG. 19.

As shown in the figure, in this monitor 1, detection data taking processing from the detecting means 101 (1901) and comparison processing with initial data (step 1902) are carried out, and on the basis of the comparison result, presence or absence of an intruding object (1903) and whether the intruding object is in a warning objective area or not is judged (step 1904).

In this status, when an intruding object is detected (step 1903 YES), and it is judged that the intruding object is in a warning objective area (step 1904 YES), then judgment on warning level is carried out (step 1905).

Herein, if it is judged that the intruding object is approaching a dangerous object (step 1906 YES), a process to increase a warning level is carried out (step 1908). While, even if it is judged that the intruding object is not approaching a dangerous object (step 1906 NO), when it is judged that the moving speed thereof is slower than a reference value (step 1907 NO), then a process for maintaining the current warning level is carried out (step 1909).

On the contrary, if it is judged that the intruding object is not approaching a dangerous object (step 1906 NO), and it is judged that the moving speed thereof is faster than a reference value (step 1907 YES), then a process for decreasing the warning level is carried out (step 1910).

According to the monitor, even when it is judged that there is an intruding object by comparison of the detection data from the detecting means and the initial data (steps 1901, 1902, 1903 YES), warning is not given in uniform manner, but further, whether the intruding object is approaching a dangerous object or not (step 1906) and whether the moving speed thereof is faster or not (step 1907) are judged, and according to these judgment results, the warning level is increased (step 1908), or the current warning level is maintained (step 1909), or the warning level is decreased (step 1910), in this way, different warning levels are given according to respective situations. As a consequence, according to this monitor, it is possible to always appropriately monitor behaviors of an object in a 3-dimensional monitoring area.

Figure 20:
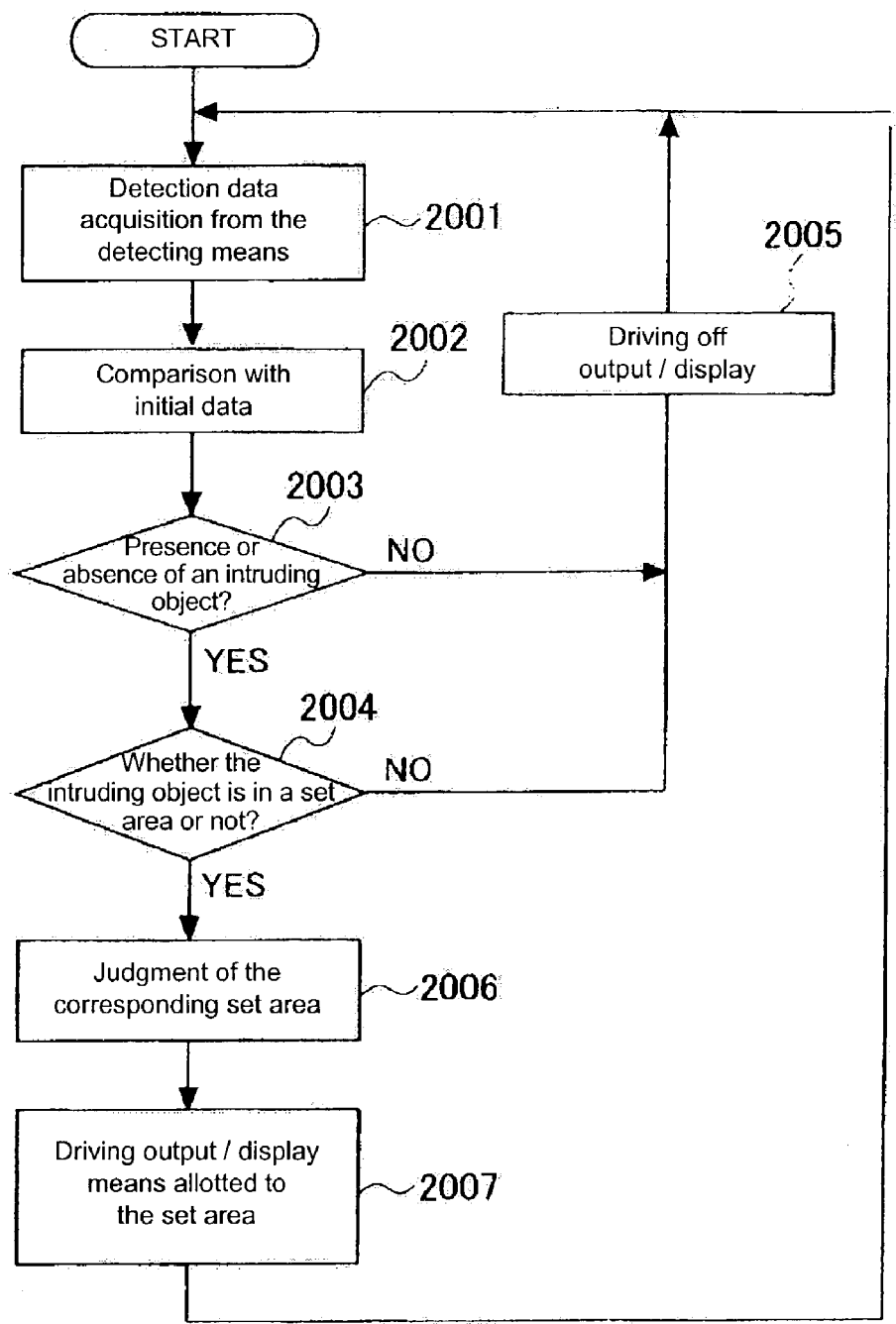
FIG. 20 is a flow chart showing a software configuration for realizing intruding object detecting function per set area.

Next, a flow chart showing a software configuration for realizing intruding object detecting function per set area is shown in FIG. 20. In this preferred embodiment, a 3-dimensional monitoring area is divided in horizontal and vertical and height directions, thereby plural 3-dimensional monitoring areas (box cells) are set, and presence or absence of an intruding object is judged to each of these box cells, and when intrusion into any of the set areas (box cells) is confirmed, control output or display output peculiar to the set area concerned are output to the outside.

Namely, when the pressing is started in the figure, detection data taking processing from the detecting means (step 2001) and comparison processing with initial data (step 2002) are carried out, and on the basis of the comparison result, presence or absence of an intruding object (step 2003) and whether the intruding object is in a set area or not is judged repeatedly (step 2004). When it is judged that there is no intruding object (step 2003 NO), or it is not intrusion into a set area (step 2004 NO), then driving of control output or display output in the status is kept off (step 2005).

On the contrary, if it is judged that an intruding object has intruded into a set area on the basis of the comparison of the detection data and the initial data (step 2004 YES), the corresponding set area (box cell) is identified (step 2006), and the output or display means allotted to the corresponding set area is driven (step 2007). Thereby, in the case when a human body or the like intrudes into a 3-dimensional monitoring area, control output or display output according to the area where such intrusion has occurred are output to the outside, thereby appropriate monitoring may be realized.

Figure 21:
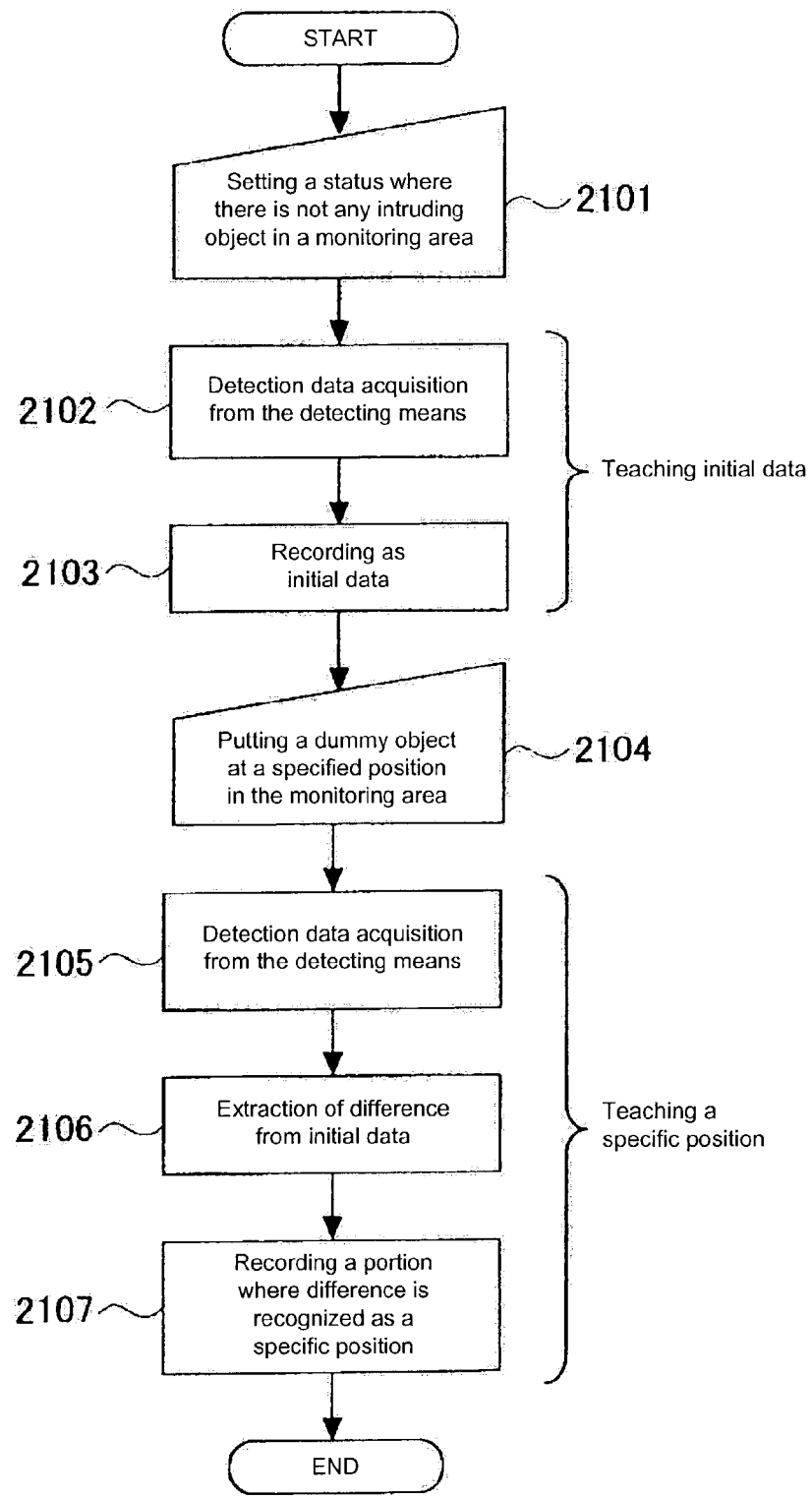
FIG. 21 is a flow chart showing a software configuration for realizing a function to teach a specified position (area) in a monitoring area.

Next, a flow chart showing a software configuration for realizing a function to teach a specified position (area) in a monitoring area is shown in FIG. 21. In this preferred embodiment, in a 3-dimensional monitoring area, when to set a specific area to a monitor, its setting operation may be realized by a method wherein a dummy object is put in a desired area, and thereby teaching processing is carried out.

When the pressing is started in the figure, first, setting is made to a status where there is not any intruding object in a monitoring area (step 2101), then initial data teaching process is carried out. In this initial data teaching processing, monitoring data is taken in from the detecting means (step 2102), and is recorded as initial data (step 2103).

Following the above, a dummy object is put at a specified position in the monitoring area (step 2104), and teaching processing of the specific position is carried out. In this teaching processing at the specific position, monitoring data is taken in from the detecting means (step 2105), and difference with the initial data is extracted (step 2106), and a portion where difference is recognized is recorded as a specific position (step 2107).

As a result of the processes, by putting the dummy object at a position that a worker desires, it is possible to set the specific position where the dummy object is placed to a monitor. In other words, in setting a specific closed space in a 3-dimensional monitoring area to a monitor, just without teaching the xyz coordinates of the closed space by use of a separate operating means, but only by placing anything of a dummy object in desired closed space, it is possible to set the specific position in a specific closed space in a 3-dimensional monitoring area to a monitor.

Figure 23:
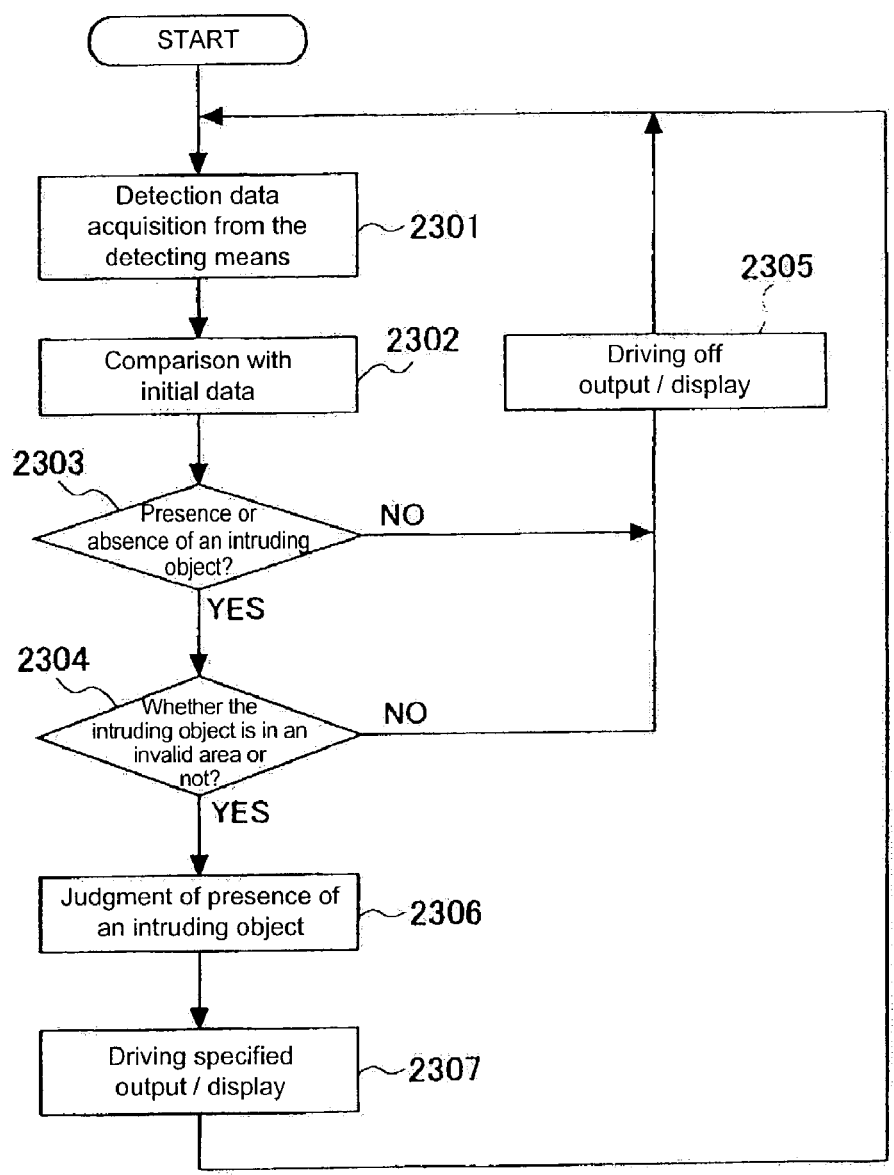
FIG. 23 is a flow chart showing a software configuration for realizing a 3-dimensional blanking function.

Next, an explanatory flow chart of a 3-dimensional blanking function is shown in FIG. 21, and a flow chart showing a software configuration for realizing the same function is shown in FIG. 23. In this preferred embodiment, as shown in FIG. 23, a 3-dimensional monitoring area 15 is divided into plural areas, and a 3-dimensional blanking (non monitoring) area 16 may be set therein. And in this 3-dimensional blanking area 16, even at the occurrence of intrusion of any object thereinto, such an object is excluded from monitoring object exclusively in the 3-dimensional blanking area 16.

In order to realize this 3-dimensional blanking function, in a micro computer configuring a monitor, the processing shown in FIG. 23 is carried out. More specifically, when the processing is started in FIG. 23, detection data taking processing from the detecting means (2301) and comparison processing with initial data (step 2302) are carried out, and on the basis of the comparison result, presence or absence of an intruding object (2303) and whether the intrusion is in other than the invalid area or not is judged repeatedly (step 2304).

Figure 22:
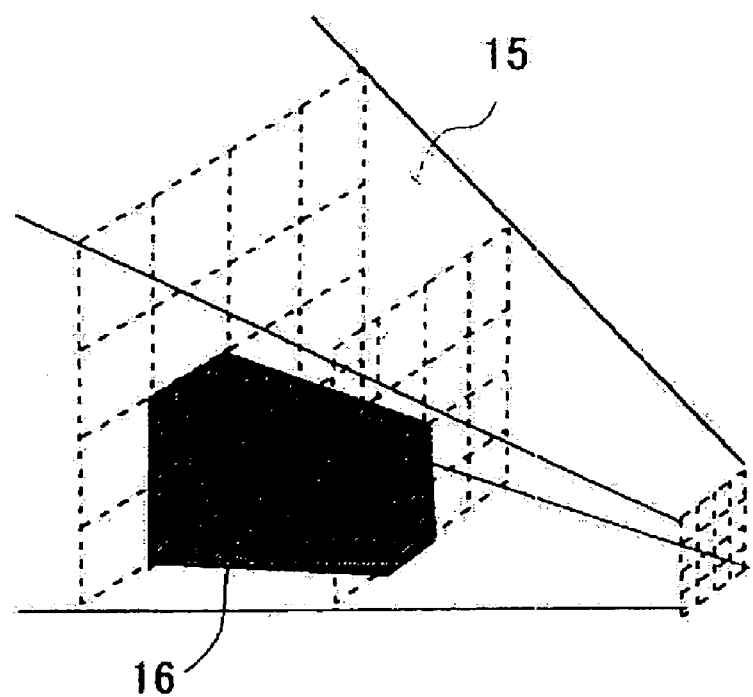
FIG. 22 is an explanatory diagram of a 3-dimensional blanking function.

Herein, even if it is judged that there is an intruding object (step 2303 YES), when it is judged that the intruding object is intruding to the 3-dimensional blanking area 16 set in FIG. 22 (step 2304 NO), then driving of control output or display output is kept off (step 2305). Therefore, even if an intruding object exists, when it is judged that the intruding object is intruding into the blanking area 16, no output nor warning or the like is given even in the 3-dimensional monitoring area 15.

On the contrary, if any intruding object is found (step 2303 YES), and it is judged that the intrusion thereof is into other than the invalid area (step 2304 YES), it is judged that there is an intruding object (step 2306), and specified output and display are driven (step 2307), and control output or display output are given to the outside.

Therefore, according to this preferred embodiment, in the case when there is an area that does not require monitoring, in a 3-dimensional monitoring area, only the area concerned may be set partially as a blanking area, thereby it is possible to avoid unnecessary control output, warning output or so.

Figure 24:
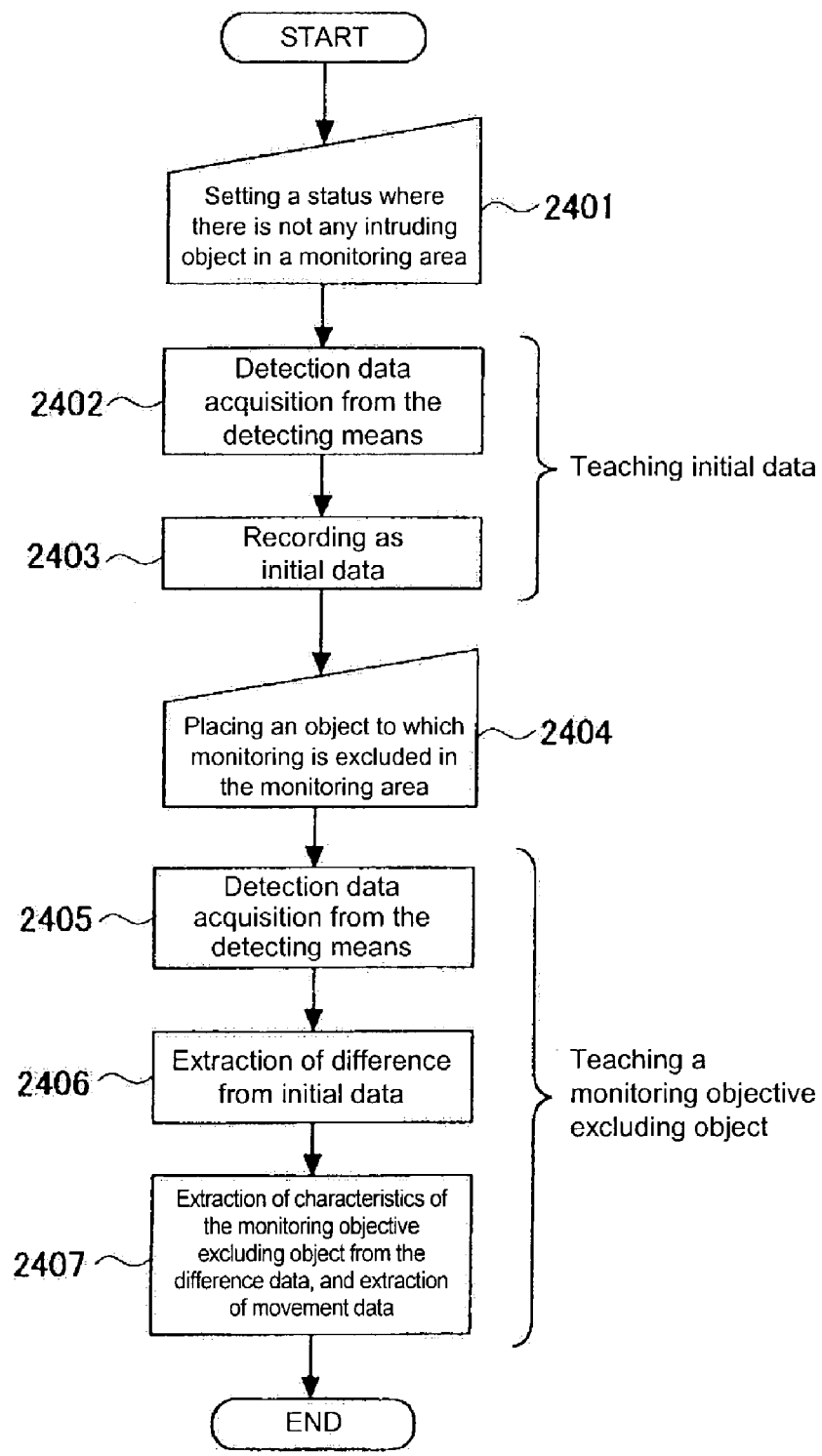
FIG. 24 is a flow chart showing a software configuration for realizing the function to set a monitoring objective excluding object.
Figure 26A:
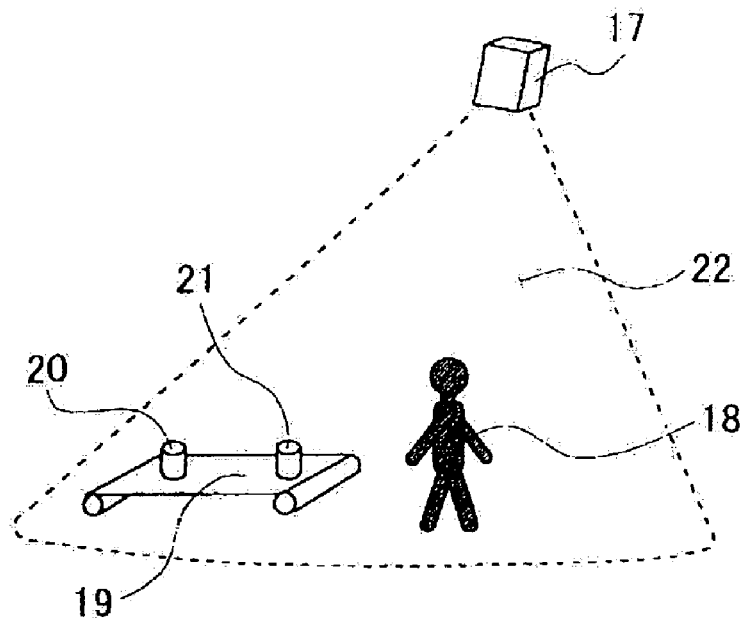
FIGS. 26A and 26B are explanatory diagrams showing an applied example of a monitor.

Next, a flow chart showing a software configuration for realizing a function to set a monitoring objective excluding object is shown in FIG. 24. In this preferred embodiment, as shown in FIG. 26A, even when there are various moving objects in a 3-dimensional monitoring area 22 of a monitor 17, those objects such objects 20 and 21 being transferred on a conveyor 19 which do not require monitoring are excluded from monitoring objects, while other moving object like a human body 18 may be set as a monitoring object in a precise manner.

Namely, in FIG. 24, when the processing is started, first, an operator sets the monitoring area to a status where there is not any intruding object (step 2401), and then carries out initial data teaching processing. In this initial data teaching processing, first, monitoring data is taken in from the detecting means (step 2402), and this data is recorded as initial data (step 2403).

Following the above, the operator places an object to which monitoring is excluded in the monitoring area (step 2404), and carries out teaching of the monitoring object excluding object. In the monitoring object excluding object teaching, monitoring data is taken in from the detecting means (step 2405), and difference with the initial data is extracted (step 2406), and from the difference data, characteristics of the monitoring object excluding object are extracted, and also movement data is extracted (step 2407).

Thereby, the objects 20 and 21 on the conveyor 19 as monitoring object excluding objects are excluded from monitoring object, thereby it is possible to avoid unnecessary control output, warning output or so.

Figure 25:
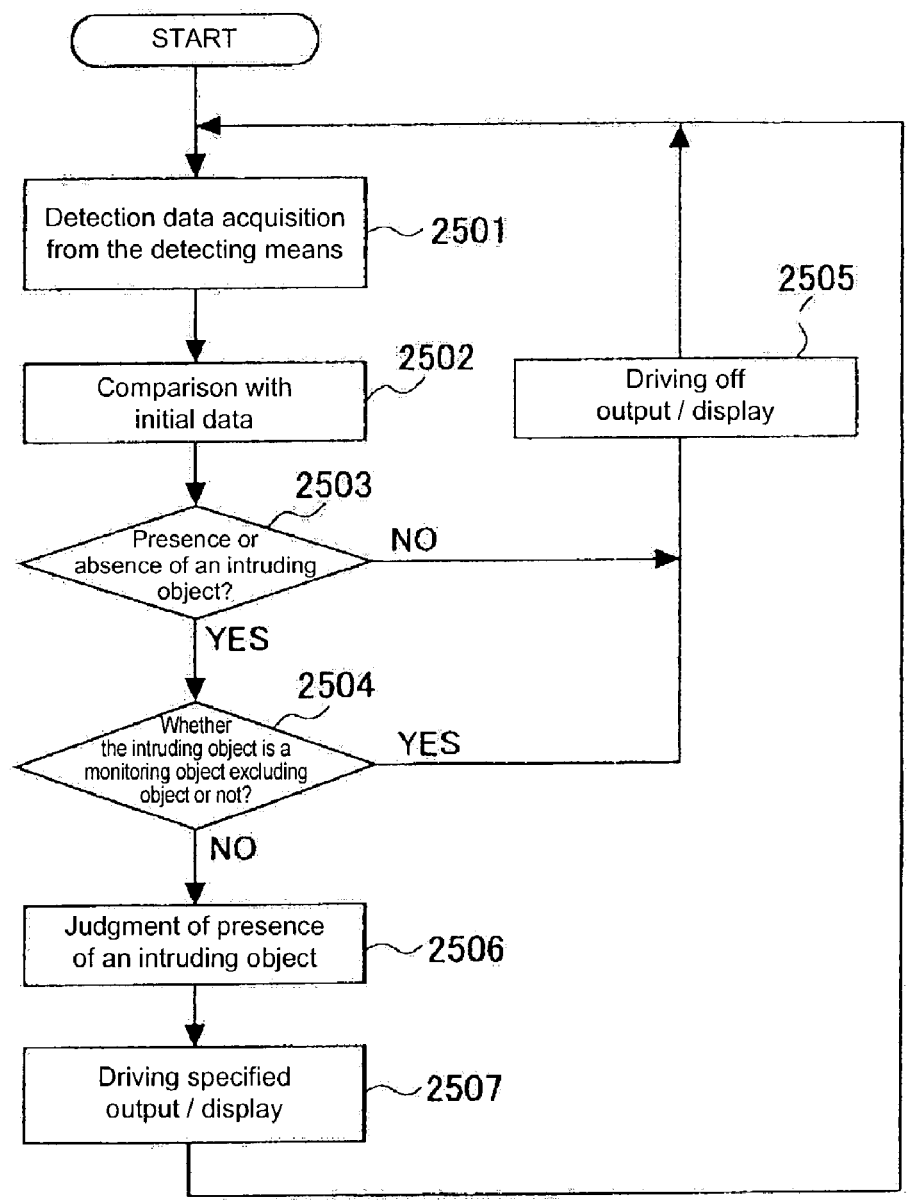
FIG. 25 is a flow chart showing a software configuration for realizing the monitoring objective excluding function.

A flow chart showing a software configuration for realizing the monitoring object excluding function is shown in FIG. 25. In the figure, when the processing is started, detection data taking process from detecting means (step 2501) and comparison processing with initial data (step 2502) are carried out, and on the basis of the comparison result, presence or absence of an intruding object (step 2503) and whether a monitoring object excluding object or not (step 2504) are carried out repeatedly.

Herein, when it is judged that there is not any intruding object (step 2503 NO), and when it is judged that such an intruding object is a monitoring object excluding object (step 2504 YES), then driving of control output or display output is kept off (step 2505), and no control output nor display output is given.

On the contrary, if it is judged that there is an intruding object (step 2503 YES), and it is judged that the intruding object is not a monitoring object excluding object (step 2504 NO), then it is judged that there is an intruding object (step 2506), and a specified output or display is driven (step 2507), and control output or display output are given to the outside.

As described above, according to the present preferred embodiment, even if there are various moving objects in a 3-dimensional monitoring area, those objects whose movements may be forecasted like the objects 20 and 21 moving on the conveyor 19 are excluded from monitoring object, while only an object whose movement cannot be forecasted like the human body 18 may be monitored in precise manner, thereby the degree of freedom in setting monitoring object is enhanced.

Figure 27:
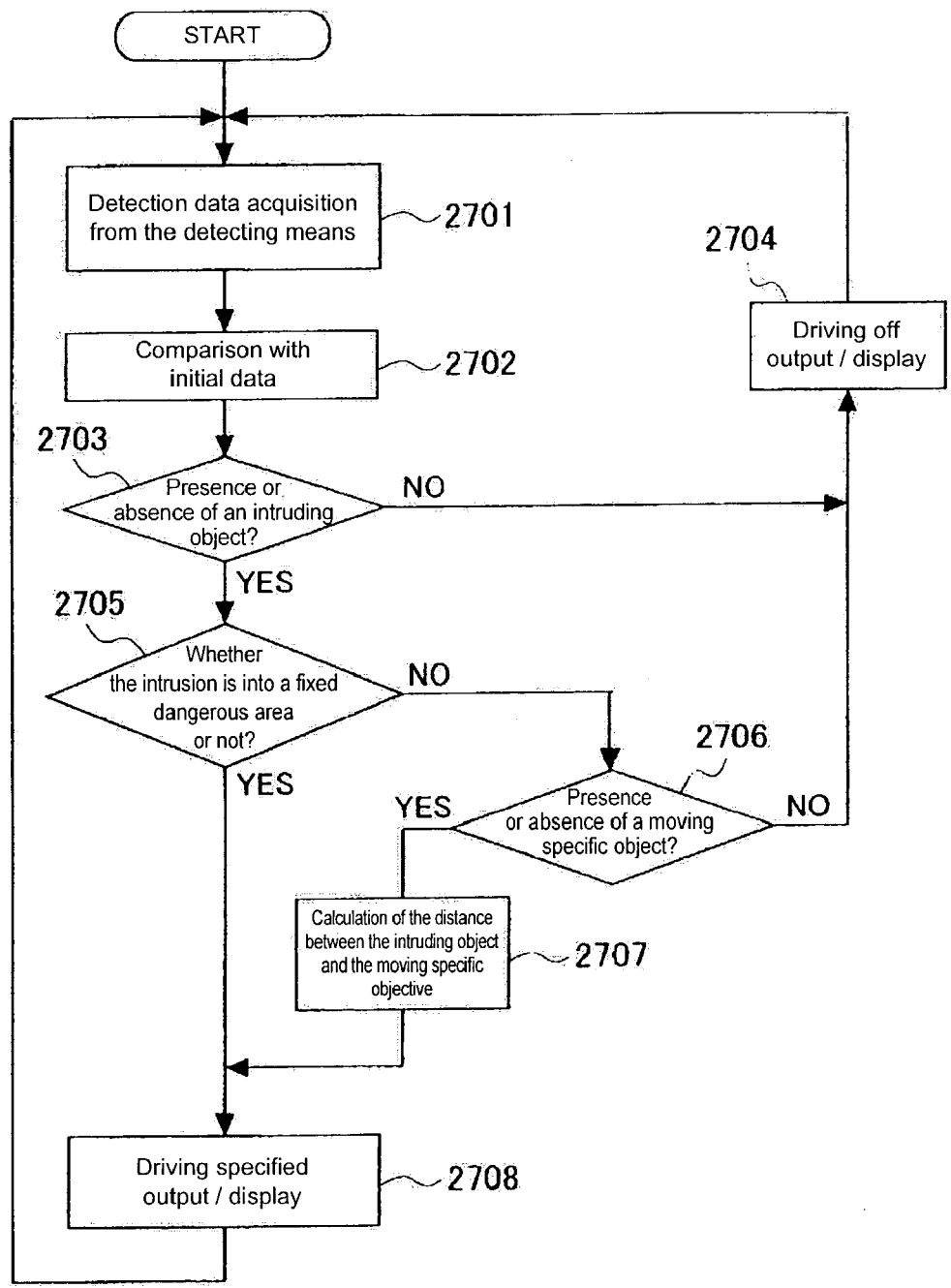
FIG. 27 is a flow chart showing a software configuration for realizing the function to monitor the distance between a moving object and an intruding object.

Next, a flow chart showing a software configuration for realizing a function to monitor the distance between a moving object and an intruding object is shown in FIG. 27.

Figure 26B:
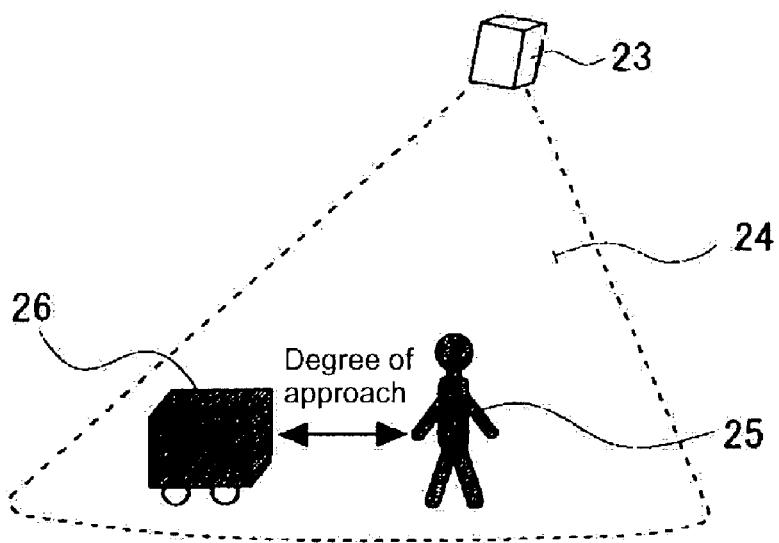

In this preferred embodiment, as shown in FIG. 26B, in the case where there is a dangerous moving object 26 in a 3-dimensional monitoring area 24 that a monitor 23 monitors, the distance between an intruding object 25 and the moving object 26 is always monitored, thereby it is possible to avoid danger due to the reduction in distance between the human body 25 and the dangerous object.

Namely, in the preferred embodiments explained heretofore, the situation wherein a dangerous object is at standstill in a 3-dimensional monitoring area has been assumed, while in this preferred embodiment, a situation wherein such the dangerous object itself moves in a monitoring area 24 is assumed. In this case, even if the human body 25 remains stationary, still the moving object 26 may move around, and as a result, the human body 25 may be placed in a dangerous situation.

When the processing is started in FIG. 27, at the side of the monitor, detection data taking process from the detecting means (step 2701) and comparison processing with initial data (step 2702) are carried out, and on the basis of the comparison result, presence or absence of an intruding object (step 2703) and whether it is intrusion into a fixed dangerous area or not are judged (step 2705), and further presence or absence of a moving specific object (step 2706) is judged repeatedly.

Herein, when it is judged that there is not any intruding object (step 2703 NO), and when it is judged that such an intrusion is not into a fixed dangerous area (step 2705 NO), and further when it is judged that there is no moving specific object (step 2706 NO), then driving of specific output and display is kept off (step 2704).

On the contrary, if it is judged that there is an intruding object (step 2703 YES), and it is judged that such an intrusion is into a fixed dangerous area (step 2705 YES), or even when it is judged that such an intrusion is not into a fixed dangerous area (step 2705 NO), if it is judged that there is a moving specific object (step 2706 YES), the distance between the intruding object and the moving specific object is calculated (step 2707), and a specific output or display corresponding to the calculated distance is driven, and output corresponding to the approach degree of the moving object 26 and the intruding object 25 is issued.

It should be noted that, in the step 2705, the judgment whether the intrusion is into a fixed dangerous area or not is made assuming the case wherein there is a general monitoring area separate from the moving specific object.

As explained above, according to the present preferred embodiment, as shown in FIG. 26B, in the case where there are the moving object 26 and the human body 25 as an intruding object in the 3-dimensional monitoring area 24, it is possible to send out control output or display output according to the approach degree of the both to the outside.

Figure 28A:
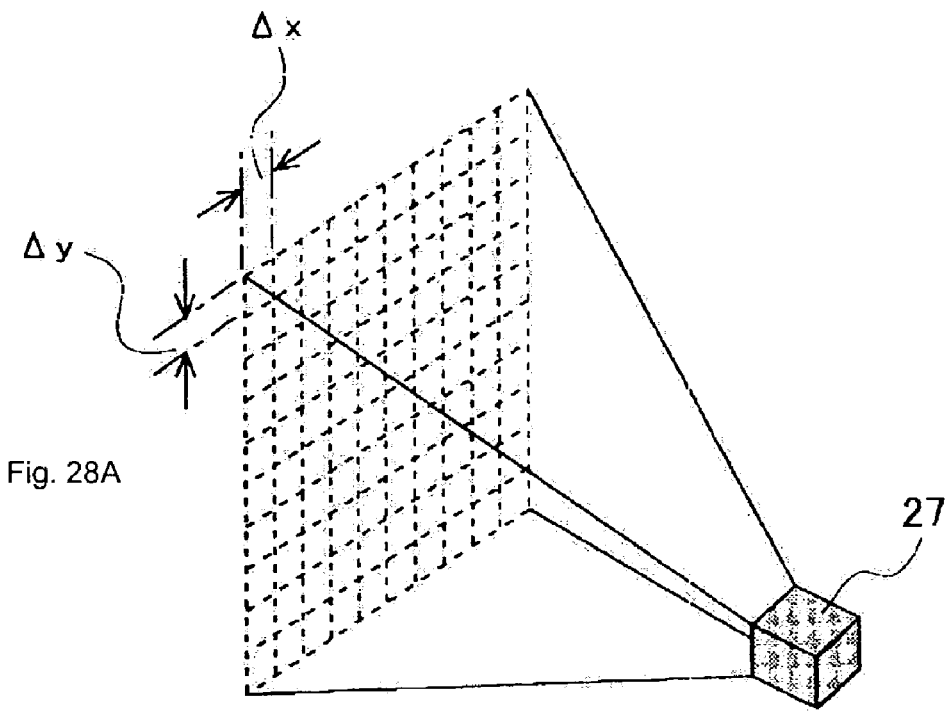
FIGS. 28A and 28B are explanatory diagrams of response speed enhancing function by use of area limitation.
Figure 28B:
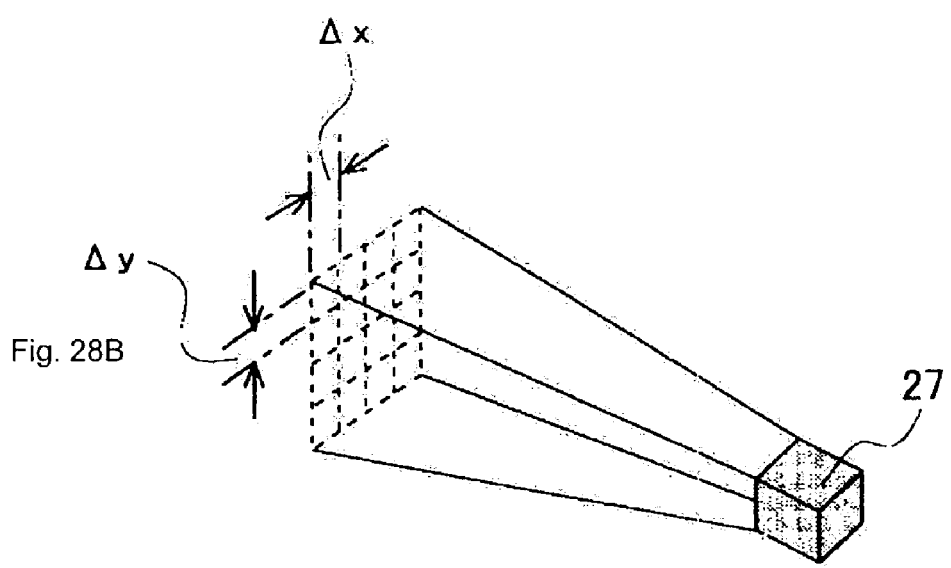
Figure 29:
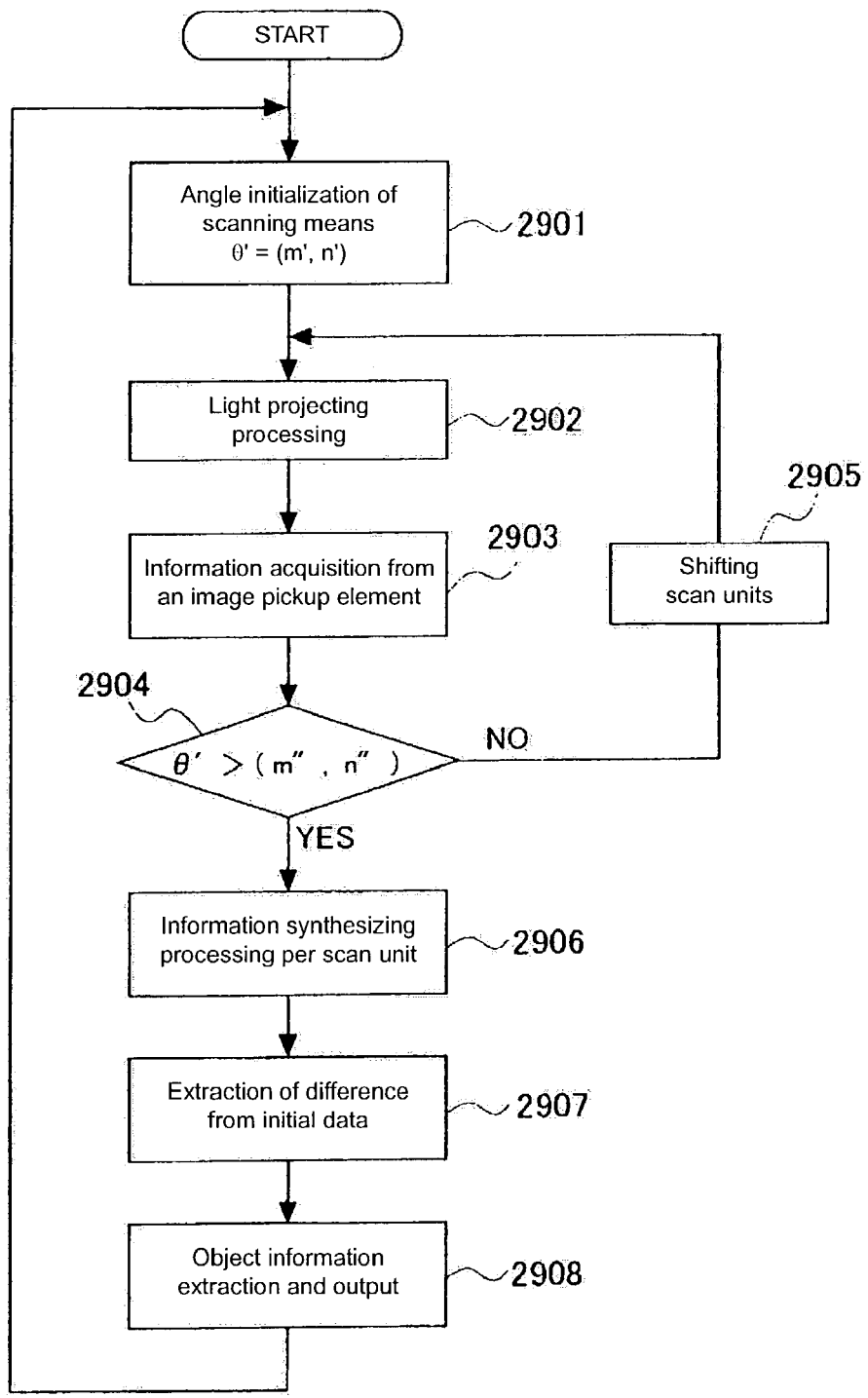
FIG. 29 is a flow chart showing a software configuration for realizing the response speed enhancing function by use of area limitation.

Next, an explanatory diagram of response speed enhancing function by use of area limitation is shown in FIG. 28, and a flow chart showing a software configuration for realizing the same function is shown in FIG. 29. Further, an explanatory diagram showing one example of limited area, is shown in FIG. 30.

In this preferred embodiment, in scanning means for scanning laser light so as to be irradiated in plane shape, the number of scanning units is reduced without changing the scanning unit amount, thereby, detection response with respect to a limited 3-dimensional monitoring area is facilitated. Namely, as shown in FIG. 28, at maximum, as shown in FIG. 28A, in the case where plane-shaped scanning having a specific scanning unit amount in horizontal direction and vertical direction and a specific number of scanning units, as shown in FIG. 28B, by reducing the number of scanning units without changing scanning unit amount, it is possible to facilitate detection response with respect to a limited 3-dimensional monitoring area.

Figure 30:
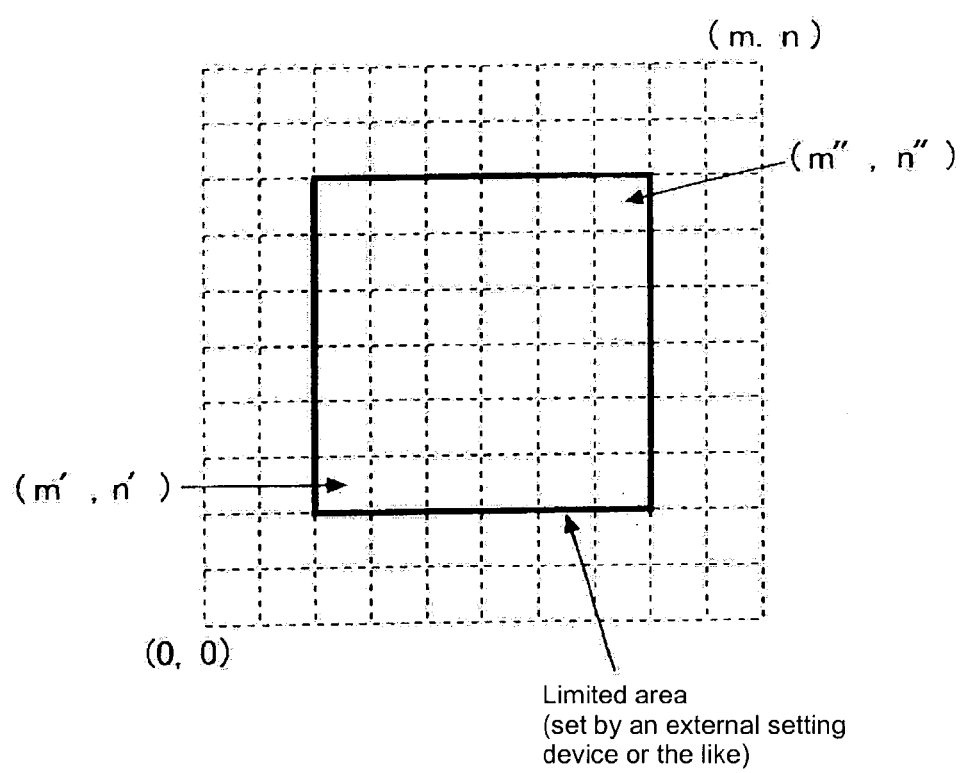
FIG. 30 is an explanatory diagram showing one example of limited area.

In other words, as shown in FIG. 30, when a limited area (m', n')–(m", n") is set in the range as the maximum scanning range (0, 0)–(m, n), as shown in the flow chart in FIG. 29, the scanning range in monitor 27 is carried out only in the limited range, thereby processing speed is increased, and response speed is enhanced.

Namely, when the processing is started in FIG. 29, θ'=(m', n') is carried out as angle initialization of scanning means (step 2901), then only in the range of θ'>(m", n"), scan units are shifted (step 2905), and light projecting processing (step 2902) and information taking process of an image pickup element are carried out (step 2903).

As a result, as the size of (m"–m', n"–n') becomes smaller, the times of loops via which the scan unit shifts its processing (step 2905) becomes smaller, as a consequence, response time becomes shorter.

When information of image pickup elements with respect to the limited area is taken all (step 2904 YES), information synthesizing processing per scan unit (step 2906), difference extraction processing with initial data (step 2907) and object information extraction and output processing (step 2908) are carried out immediately, and thereby control output or display output corresponding to monitoring information with respect to the limited area concerned are output to the outside.

Figure 31A:
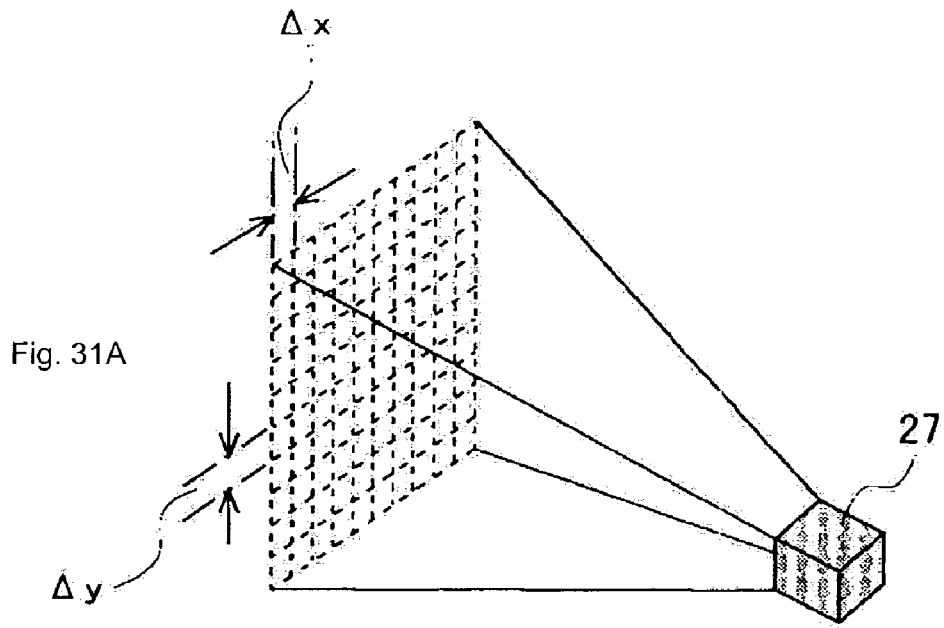
FIGS. 31A and 31B are explanatory diagrams of resolution enhancing function by area limitation.
Figure 31B:
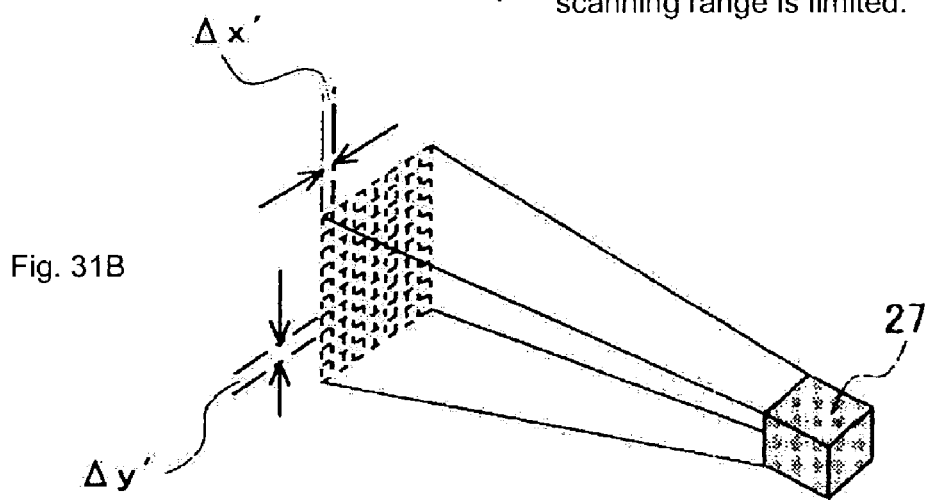
Figure 32:
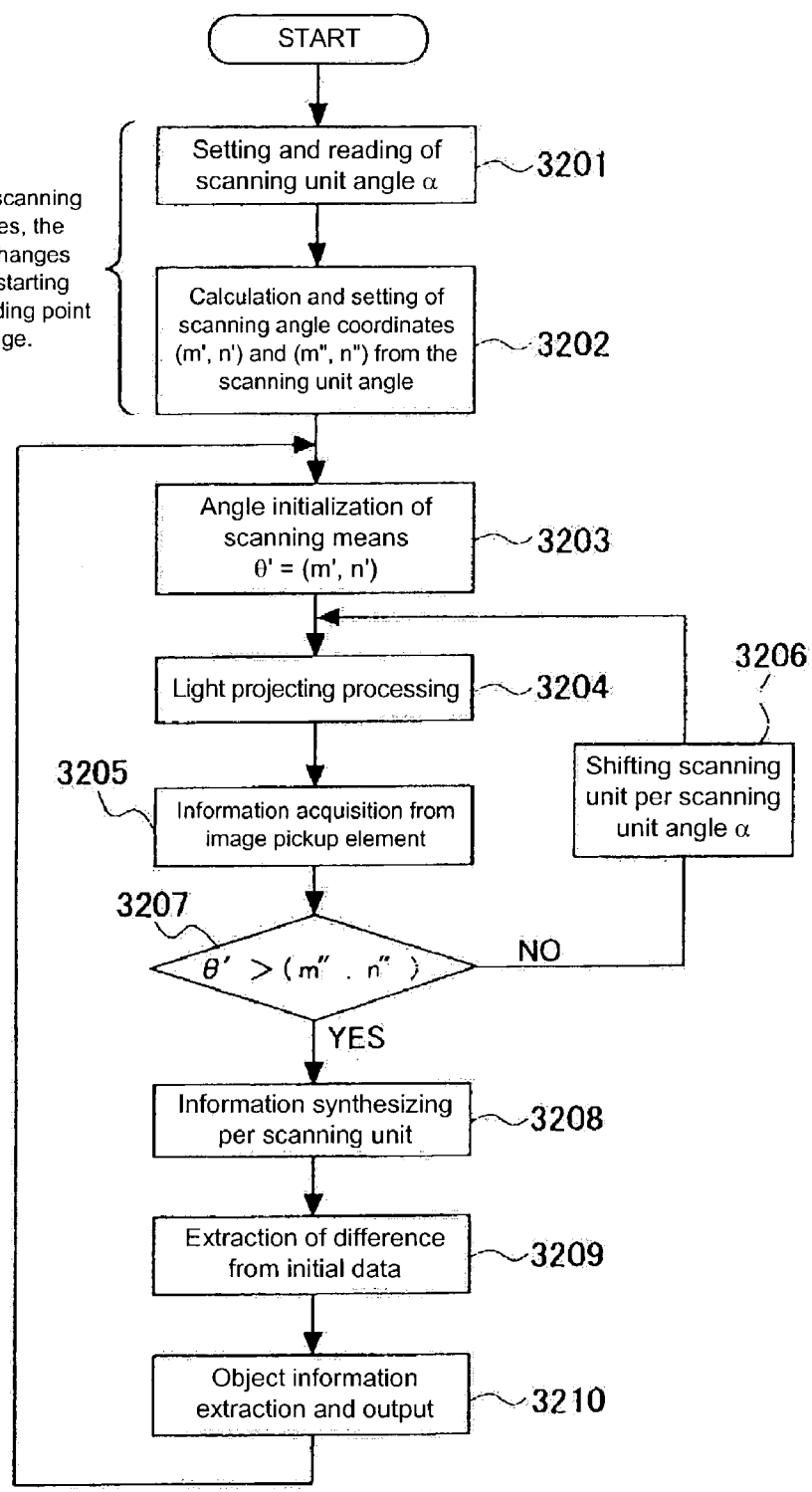
FIG. 32 is a flow chart showing a software configuration for realizing the resolution enhancing function by area limitation.
Figure 33:
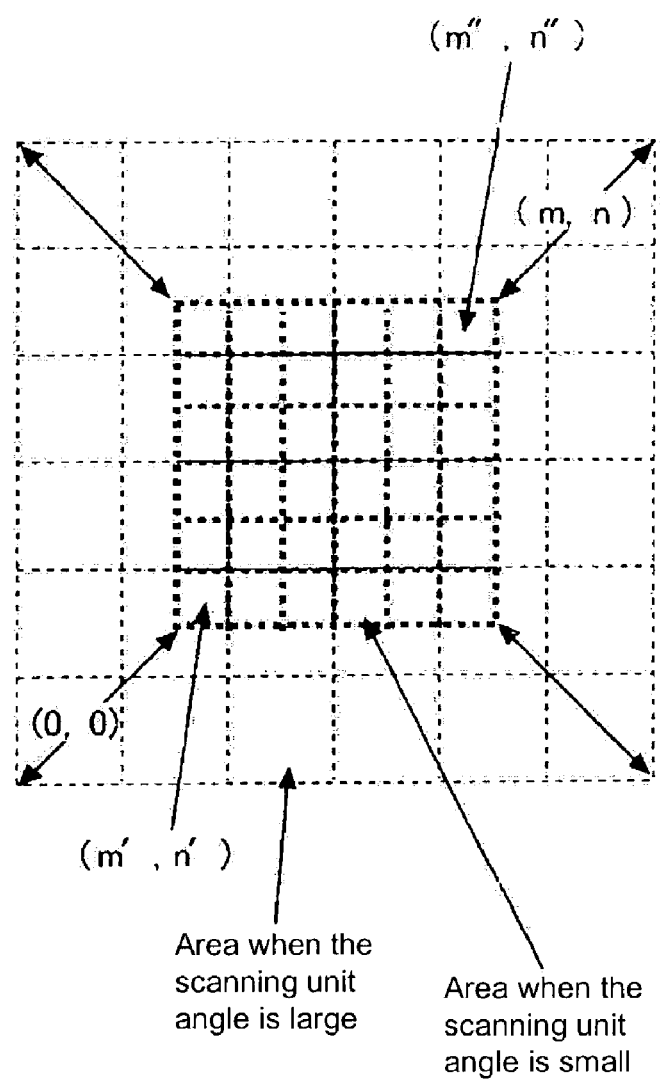
FIG. 33 is an explanatory diagram (No. 1) showing the resolution enhancing function by area limitation.
Figure 34:
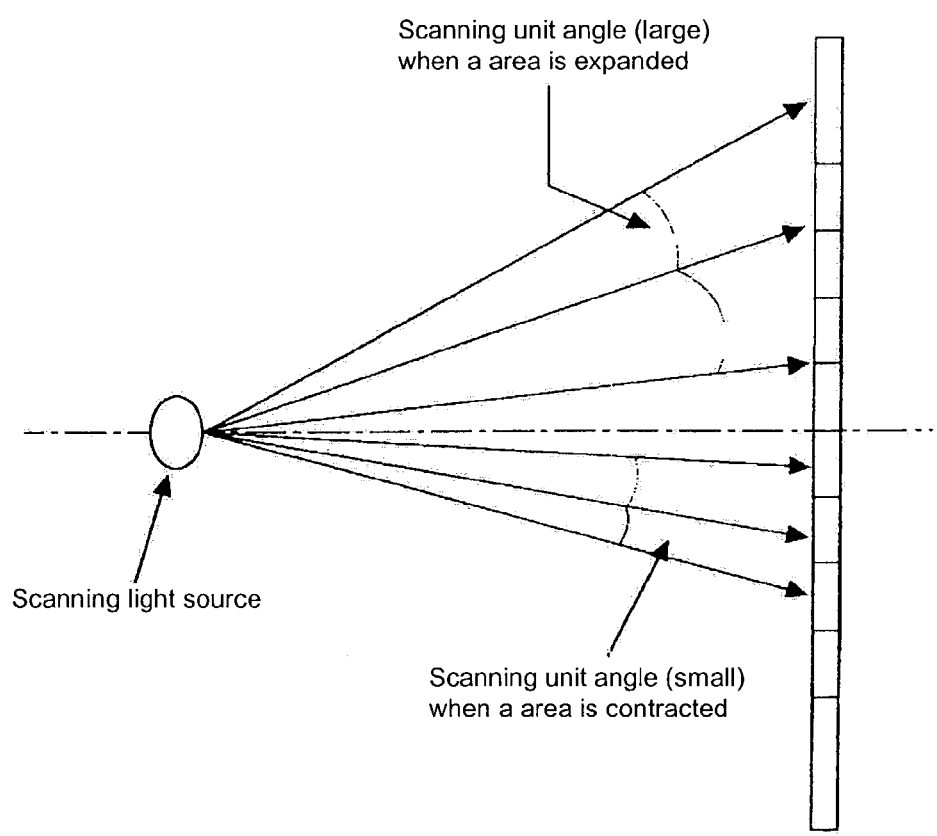
FIG. 34 is an explanatory diagram (No. 2) showing the resolution enhancing function by area limitation.

Next, an explanatory diagram of the resolution enhancing function by area limitation is shown in FIG. 31, and a flow chart showing a software configuration for realizing the same function is shown in FIG. 32, while an explanatory diagram (No. 1) showing the same function is shown in FIG. 33, and an explanatory diagram (No. 2) showing the same function is shown in FIG. 34.

In this preferred embodiment, the scanning means for scanning laser light in a planar configuration is configured so that the number of scanning area is reduced without changing the scanning unit amount (e.g. the number of pixels), thereby, detection resolution in the reduced or limited 3-dimensional monitoring area, is facilitated.

Namely, as shown in FIG. 31A, in the case where plane-shaped scanning is available on a specific number of units at a specific scanning unit amount Δx, Δy, the unit amount is reduced from Δx to Δx', and from Δy to Δy', and the number of scanning units are kept as previous, and a scanning range is limited, thereby it is possible to improve resolution.

More specifically, as shown in FIG. 33, in the case when a regular scanning range is (0, 0)–(m, n), and this range is limited to a smaller area (m', n')–(m", n"), while the number of scanning units or pixels is kept unchanged, the result is that the limited smaller area is scanned for the same number of units of pixels as for the area before limitation, thereby reducing the size of the pixels in the illustrated manner rendering it possible to improve resolution.

At this time, as shown in FIG. 34, the scanning unit angle becomes larger when an area is widened, while that at the moment when an area is narrowed becomes smaller. From this, it may be understood that it is also possible to monitor a limited smaller area with improved resolution.

In order to monitor this limited smaller area, the processing shown in FIG. 32 is carried out.

Specifically, when the processing is started in FIG. 32, first, the scanning unit angle a is set and read (step 3201), then the scanning angle coordinates (m', n') and (m", n") are calculated and set from the scanning unit angle (step 3202). This is done for changing the starting point and the ending point of scanning since when the scanning unit angle changes, the size of an area changes accordingly.

Following the above, θ'=(m", n") is set for angle initialization of scanning means (step 3203), further, scanning unit is shifted per scanning unit angle a (step 3206), and until θ'>(m", n") is confirmed (step 3207 NO), light projecting processing (step 3204) and information taking processing of image pickup element (step 3205) are carried out repeatedly. At this time, though the scanning unit angle changes, the total number of scanning units is same, therefore, response speed appears nearly the same.

When θ'>(m', n') is confirmed (step 3207 YES), information synthesizing processing per scanning unit (step 3208), difference extraction processing with initial data (step 3209) and object information extraction and output processing (step 3210) are carried out. As a result, in the limited area regulated in FIG. 33 and FIG. 34, it is possible to monitor an object at high precision by fine scanning, and to improve recognition precision in the limited area concerned.

Figure 35:
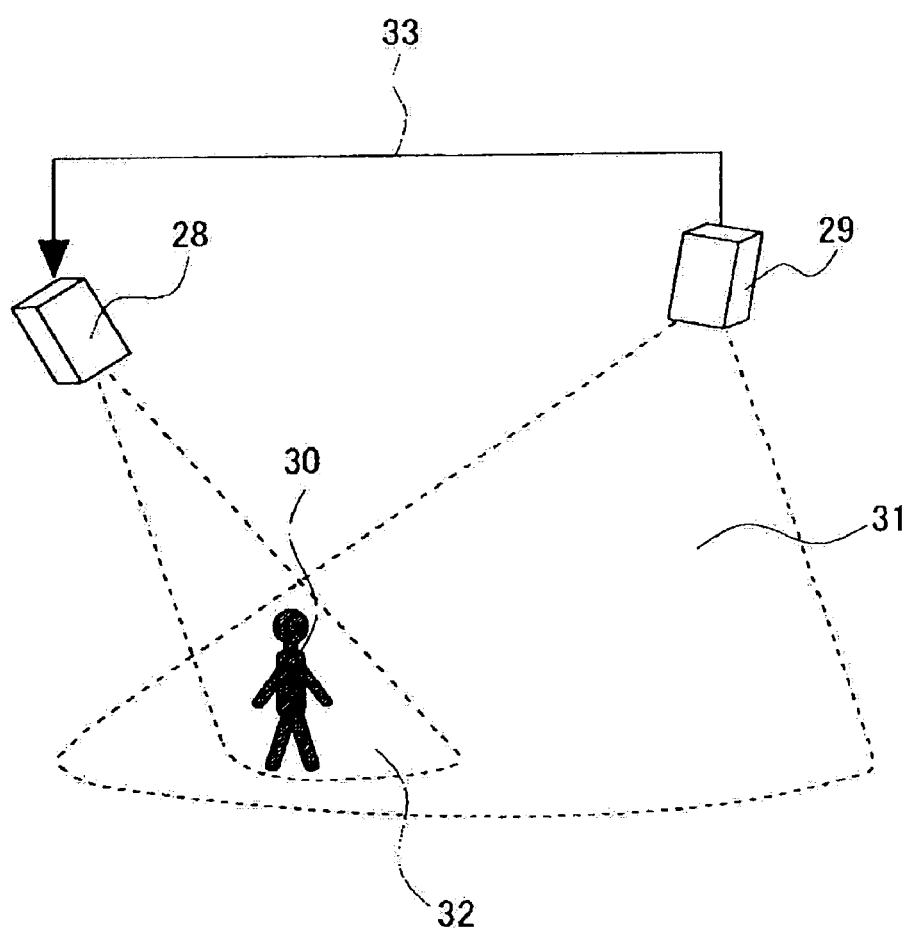
FIG. 35 is a structural diagram showing one example of a monitor system.

Finally, a structural diagram showing one example of a monitor system as an application of a monitor according to the present invention is shown in FIG. 35, while a flow chart showing a software configuration for realizing connections between monitors by use of communications.

In this preferred embodiment, monitoring is carried out by use of 2 or more units of monitors or more, and information with respect to intruding object detection is exchanged among monitors, and the capabilities of respective monitors are made the most of and through cooperation among monitors, it is possible to carry out intruding object monitoring in further more effective manner.

Specifically, in FIG. 35, a first monitor 29, by use of detecting means 101 that enables to monitor an intruding object in a 3-dimensional monitoring area, monitors a human body 30 as an intruding object in the 3-dimensional monitoring area 31. In the same manner, a second monitor 28, by use of detecting means 101 that enables monitoring an intruding object in a 3-dimensional monitoring area, monitors the human body 30 as an intruding object in the 3-dimensional monitoring area 31. Between the first monitor 29 and the second monitor 28, there is communication means 33 for transmitting information. The first monitor 29 has a function to inform via the communication means 33 to the second monitor 28 of the position of an intruding object if found in the 3-dimensional monitoring area 31. The second monitor 28 has a function to curtail its monitoring area to a limited area 32 including the position of an intruding object when such an intruding object has found and the notice to that effect is made from the first monitor 29, and to increase detection response or increase detection resolution, thereby to carry out monitoring.

Figure 36:
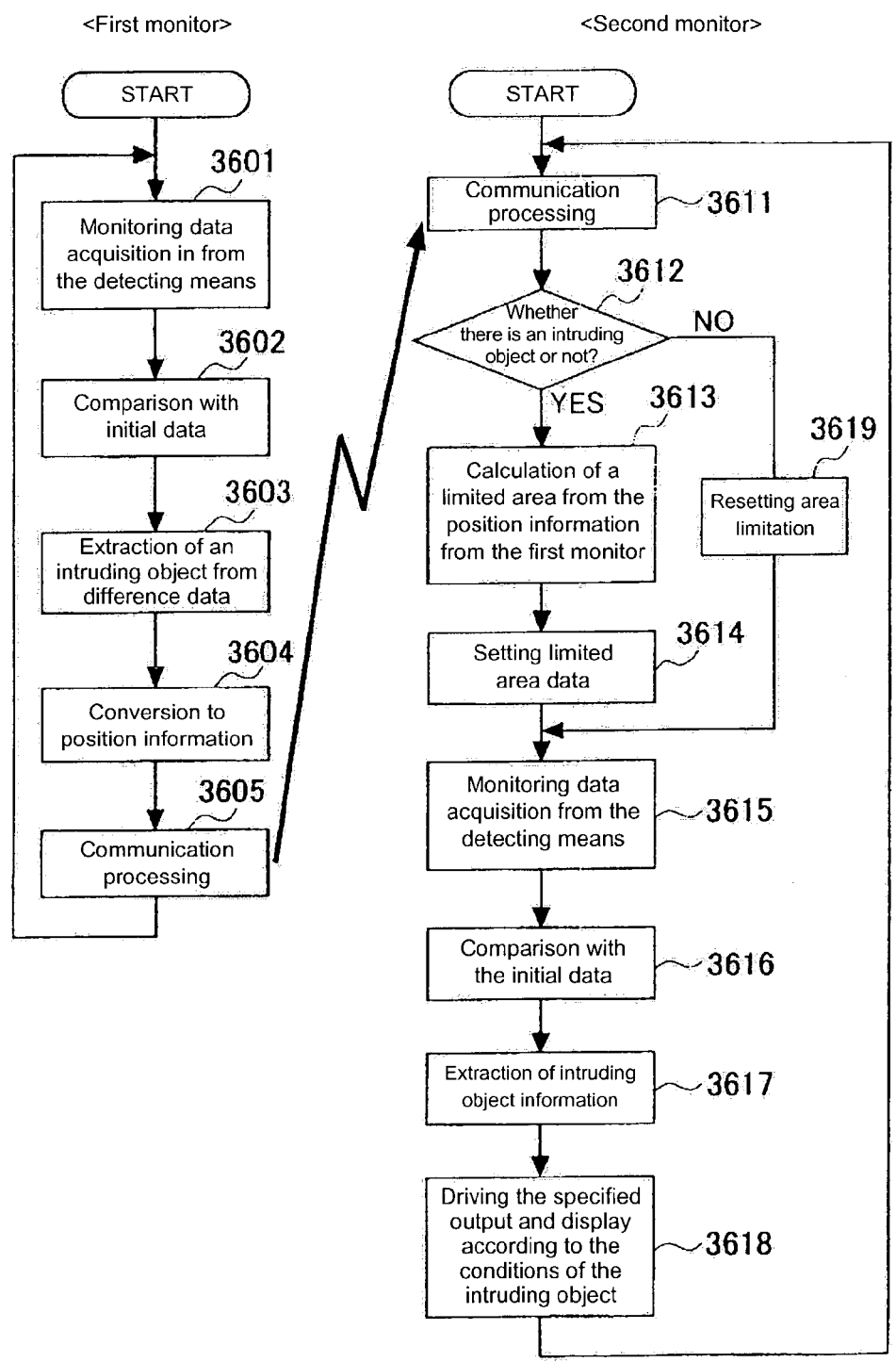
FIG. 36 is a flow chart showing a software configuration for realizing the cooperation among monitors via communications.

More specifically, as shown in FIG. 36, at the side of the first monitor, monitoring data is taken in from the detecting means (step 3601), comparison with initial data is carried out (step 3602), and intruding object is extracted from difference data (step 3603), conversion to position information is carried out (step 3604), and communication processing for informing the second monitor of the position information obtained in this manner (step 3605) is carried out repeatedly.

On the other hand, at the side of the second monitor, in communication processing (step 3611), the second monitor receives the notice of the position information from the first monitor, and on the basis thereof, judges whether there is an intruding object or not (step 3612).

Herein, if there is no intruding object (step 3612 NO), area limitation is reset (step 3619), and in the initial maximum scanning range, monitoring data is taken in from the detecting means (step 3615), and comparison with the initial data is carried out (step 3616), and the information of intruding object is extracted (step 3617), and according to the conditions of the intruding object, specified output and display are driven (step 3618).

While, in the communication processing (step 3611), when notification of position information of an intruding object is made from the first monitor to the second monitor, it is judged that there is an intruding object (step 3612 YES), and in this case, a limited area is calculated from the position information from the first monitor (step 3613), limited area data is set (step 3614), and with regard to the limited area 32 shown in FIG. 35, monitoring data is taken in from the detecting means (step 3615), comparison with the initial data is carried (step 3616), intruding object information is extracted (step 3617), and according to the conditions of the intruding object, specified output and display are driven (step 3618).

In this way, according to the monitor system explained above, when the human body 31 is detected in the monitoring area 31, the notification to that effect is made from the first monitor 29 to the second monitor 28, as a result, at the side of the second monitor 28, the monitoring area thereof is curtailed to the limited area 32, and thereby the second monitor 28 obtains detailed information with respect to the human body 23. At this time, if the area limitation processing by reduction of the number of scanning units explained previously is conducted, it is possible to monitor behaviors of the human body 30 at high response, while if the method to carry out area limitation by limiting the scanning unit amount, then it is possible to monitor delicate actions of the human body 30 at high precision.

As is apparent from the explanation, according to the present invention, for example, in applications to monitor intrusion of a human body to a dangerous area and to monitor approach of a human body to a dangerous object, it is possible to monitor intrusion and approach in a precise manner, irrespective of intrusion routes.

Further, according to the present invention, in applications to monitor intrusion of a human body to a dangerous area and to monitor approach of a human body to a dangerous object mentioned above, it is possible to forecast possibility prior to actual intrusion or approach and to give a warning or the like.

Further, according to the present invention, in applications to monitor intrusion of a human body to a dangerous area and to monitor approach of a human body to a dangerous object mentioned above, it is possible to arbitrarily set plural dangerous areas or dangerous objects in a monitoring area, and to monitor or forecast intrusion or approach to the respective dangerous areas or dangerous objects at the same time.

Still further, according to the present invention, in applications to monitor intrusion of a human body to a dangerous area mentioned above, in circumferential areas around a dangerous area, it is possible to leave out permitted areas including safe routes, normal work routes and the like, from a monitoring objective area, thereby it is possible to enhance monitoring precision.

Yet still further, according to the present invention, in applications to monitor approach of a human body to a dangerous object mentioned above, an arbitrary object may be left out from dangerous object, thereby it is possible to improve monitoring precision.

Moreover, according to the present invention, in applications to monitor approach of a human body to a dangerous object as mentioned above, even in a situation where such a dangerous object is moving, it is possible to monitor the approach of the human body to the object in a precise manner.

What is claimed is:

1. A monitor for intrusion detection, comprising:
   detecting means for detecting an intruding object in a 3-dimensional monitoring area and outputting corresponding detection information,
   setting means for setting information necessary for monitoring a position or actions of the intruding object in the 3-dimensional monitoring area,
   monitoring information generating means for generating monitoring information concerning the position or actions of the intruding object in the 3-dimensional monitoring area, on the basis of the detection information generated by the detecting means and the setting information by the setting means, and
   external output means for outputting control output or display output according to the monitoring information concerning the position or actions of the intruding object generated by the monitoring information generating means, and wherein the detecting means include:
   an optical system employing plural cameras or image pickup elements, wherein the optical axes of the cameras are spaced and parallel, and
   calculating means for obtaining difference between images obtained from the respective cameras or image pickup elements configuring the optical system in a status without the intruding object and images obtained in a status with the intruding object, and
   measuring means for measuring the distance to the intruding object by the principle of triangulation on the basis of difference information obtained from the calculation means for each camera or each image pickup element, and thereby
   outputting distance information to the intruding object measured by the measuring means as the detection information.

2. A monitor for intrusion detection, comprising:
   detecting means for detecting an intruding object in a 3-dimensional monitoring area and outputting corresponding detection information,
   setting means for setting information necessary for monitoring a position or actions of the intruding object in the 3-dimensional monitoring area,
   monitoring information generating means for generating monitoring information concerning the position or actions of the intruding object in the 3-dimensional monitoring area, on the basis of the detection information generated by the detecting means and the setting information by the setting means, and
   external output means for outputting control output or display output according to the monitoring information concerning the position or actions of the intruding object generated by the monitoring information generating means, and wherein the detecting means include:
   a coaxial optical system including:
   light projecting means for radiating laser beam light in pulse form,
   light receiving means for receiving reflected light of the radiated laser beam light reflecting on an object and coming back, and
   scanning means for scanning the radiated laser beam light so as to be irradiated in a plane shape, and
   measuring means for measuring the distance to a reflected object per unit scanning angle by optical radar method on the basis of the difference between light projection time and light receiving time of the laser beam light, and thereby outputting distance information per scanning angle measured by the measuring means as the detection information, and wherein
   the scanning means for scanning the laser beam light in the plane shape includes a semiconductor resonance mirror.

3. A monitor for intrusion detection, comprising:
   detecting means for detecting an intruding object in a 3-dimensional monitoring area and outputting corresponding detection information,
   setting means for setting information necessary for monitoring a position or actions of the intruding object in the 3-dimensional monitoring area,
   monitoring information generating means for generating monitoring information concerning the position or actions of the intruding object in the 3-dimensional monitoring area, on the basis of the detection information generated by the detecting means and the setting information by the setting means, and
   external output means for outputting control output or display output according to the monitoring information concerning the position or actions of the intruding object generated by the monitoring information generating means, and wherein the setting means is able to set at least one position or more, or one area or more within the 3-dimensional area for monitoring of the monitoring object as a specific monitoring position or area, and
   the monitoring information generating means generates information as to whether the intruding object has moved into the specific monitoring area or not, and
   the external output means outputs control output or display output corresponding to the specific monitoring area where the intruding object has moved outside of the specific monitoring area.

4. A monitor according to claim 3, wherein the setting means is able to move the position of the monitor itself with respect to the specific monitoring position or area within the 3-dimensional monitoring area, and
   the monitoring information generating means generates information concerning the distance between the current position of the intruding object and a predetermined specific position or area within the 3-dimensional monitoring area, and
   the external output means outputs an analog control output or an analog display output corresponding to the distance between the intruding object and the specific position to outside.

5. A monitor according to claim 4, wherein
   the monitoring information generating means generates information concerning the relative movement direction between the intruding object and the specific position or area, and
   the external output means generates control output or display output corresponding to whether the relative movement direction is an approaching direction or a moving away direction.

6. A monitor according to claim 3, wherein by using teaching detection information from the detecting means indicative of a status where there is no intruding object in the 3-dimensional monitoring area, and detection information from the detecting means indicative of a status where there is a dummy object in the 3-dimensional monitoring area and which is located in the predetermined specific monitoring position or area which is located in the 3-dimensional monitoring area, the setting means is able to set the position or area where the dummy object is located as the specific monitoring area within the 3-dimensional monitoring area.

7. A monitor according to claim 3, wherein the setting means has a graphic user interface having a monitor screen for displaying images of the 3-dimensional monitoring area, the setting means is able to set the specific monitoring area or a specific position within the 3-dimensional monitoring area.

8. A monitor according to claim 3, wherein the setting means is able to set an object whose predetermined characteristics are to be taught in advance as a distance reference object, and the monitoring information generating means generates information concerning the distance between the distance reference object and the intruding object, on the basis of the detection information output by the detecting means and the setting information by the setting means.

9. A monitor according to claim 3, wherein the detecting means is configured to facilitate detection response, by reducing an area scanned without reducing a number of pixels, in the scanned area.

10. A monitor according to claim 3, wherein the setting means is configured to facilitate detection response with respect to a limited 3-dimensional area, by reducing the number of pixels without changing scanning area.

11. A monitor for intrusion detection, comprising:
detecting means for detecting an intruding object in a 3-dimensional monitoring area and outputting corresponding detection information,
setting means for setting information necessary for monitoring a position or actions of the intruding object in the 3-dimensional monitoring area,
monitoring information generating means for generating monitoring information concerning the position or actions of the intruding object in the 3-dimensional monitoring area, on the basis of the detection information generated by the detecting means and the setting information by the setting means, and
external output means for outputting control output or display output according to the monitoring information concerning the position or actions of the intruding object generated by the monitoring information generating means, and wherein the setting means is able to set a position or an area selected from the 3-dimensional monitoring area as an insensitive area, and
the monitoring information generating means omits the set insensitive area from the 3-dimensional monitoring area, and generates information relating to the position or actions of the intruding object in the 3-dimensional monitoring area, on the basis of the detection information output by the detecting means and the setting information by the setting means.

12. A monitor for intrusion detection, comprising:
detecting means for detecting an intruding object in a 3-dimensional monitoring area and outputting corresponding detection information,
setting means for setting information necessary for monitoring the position or actions of the intruding object in the 3-dimensional monitoring area,
monitoring information generating means for generating monitoring information concerning the position or actions of the intruding object in the 3-dimensional monitoring area, on the basis of the detection information generated by the detecting means and the setting information by the setting means, and
external output means for outputting control output or display output according to the monitoring information concerning the position or actions of the intruding object generated by the monitoring information generating means, and wherein the setting means is able to set an object whose characteristics are to be taught in advance as an insensitive object, and
the monitoring information generating means omits the insensitive object from the 3-dimensional monitoring area, and generates information relating to the position or actions of the intruding object in the 3-dimensional monitoring area, on the basis of the detection information output by the detecting means and the setting information set by the setting means.

13. A monitor system comprising:
a first monitor for monitoring an intruding object in a 3-dimensional area to be a monitoring objective, by use of a first detecting means for detecting the intruding object in the 3-dimensional area,
a second monitor for monitoring an intruding object in the 3-dimensional area to be a monitoring objective, by use of a second detecting means for detecting the intruding object in the 3-dimensional area, and
communication means for transmitting information between the first monitor and the second monitor, wherein
the first monitor is equipped with a function to inform the second monitor via the communication means of the position of the intruding object if found in the 3-dimensional area to be a monitoring objective, and
the second monitor is equipped with a function to limit a monitoring range of the second monitor to a limited area including the position of the intruding object based on the information of the intruding object found and the position thereof from the first monitor, and to one of increase detection response or increase detection resolution in the limited area while a monitoring range of the first monitor remains unchanged.

14. A monitor system comprising:
a first monitor for monitoring an intruding object in a 3-dimensional monitoring area as a monitoring objective, by use of a first detecting means for detecting the intruding object in the 3-dimensional monitoring area,
a second monitor for monitoring the intruding object in the 3-dimensional monitoring area, by use of a second detecting means for detecting the intruding object in the 3-dimensional monitoring area, and
communication means for transmitting information between the first monitor and the second monitor, wherein
the first monitor is equipped with a function to inform the second monitor via the communication means of the position of the intruding object if found in the 3-dimensional monitoring area to be a monitoring objective, and
the second monitor is equipped with a function to limit the monitoring range to a limited area including the position of the intruding object at information of the intruding object found and the position thereof from the first monitor, and increase detection response or detection resolution, thereby carry out monitoring,
wherein the second monitor is a monitor configured to facilitate detection response with respect to the limited area, by reducing an area scanned without reducing a number of scanning units.

* * * * *